(12) United States Patent
Nakahara et al.

(10) Patent No.: US 10,855,898 B2
(45) Date of Patent: Dec. 1, 2020

(54) LENS APPARATUS AND IMAGING SYSTEM INCLUDING THE SAME

(71) Applicant: CANON KABUSHIKI KAISHA, Tokyo (JP)

(72) Inventors: Makoto Nakahara, Utsunomiya (JP); Shu Ito, Utsunomiya (JP); Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/542,123

(22) Filed: Aug. 15, 2019

(65) Prior Publication Data

US 2020/0077001 A1 Mar. 5, 2020

(30) Foreign Application Priority Data

Sep. 4, 2018 (JP) ................................. 2018-165390

(51) Int. Cl.
*H04N 5/225* (2006.01)
*G03B 5/00* (2006.01)

(52) U.S. Cl.
CPC ............. *H04N 5/2257* (2013.01); *G03B 5/00* (2013.01); *H04N 5/2253* (2013.01); *G03B 2205/0069* (2013.01)

(58) Field of Classification Search
CPC ............... H04N 5/2257; H04N 5/2253; H04N 5/23248; H04N 5/23258; H04N 5/23287; H04N 5/2254; H04N 5/23264; H04N 5/2252; G03B 5/00; G03B 2205/0069; G03B 2205/0007; G03B 2205/0015; G03B 2217/005; G02B 27/646; G02B 27/64; H01F 7/064; H01F 7/06; H01F 27/362

USPC .......................................................... 348/374
See application file for complete search history.

(56) References Cited

U.S. PATENT DOCUMENTS

| 6,195,314 | B1 * | 2/2001 | Inui | ........................ | G11B 7/093 |
| | | | | | 369/44.14 |
| 6,631,042 | B2 | 10/2003 | Noguchi | | |
| 7,291,942 | B2 * | 11/2007 | Osaka | .................... | G02B 7/102 |
| | | | | | 310/12.04 |
| 7,457,061 | B2 * | 11/2008 | Sata | ........................ | G02B 7/08 |
| | | | | | 310/12.04 |

(Continued)

FOREIGN PATENT DOCUMENTS

| EP | 3522517 A1 | 8/2019 |
| JP | 2003322787 A | 11/2003 |

(Continued)

*Primary Examiner* — Pritham D Prabhakher

(74) *Attorney, Agent, or Firm* — Canon U.S.A., Inc. IP Division

(57) ABSTRACT

A lens apparatus includes an imaging optical system, a movable member holding at least one of lenses and configured to move in a direction including a component perpendicular to an optical axis of the imaging optical system, a fixed member whose movement in the direction is restricted, a coil provided at one of the movable member and the fixed member, a magnet provided at the other of the movable member and the fixed member, and a first shield member configured to cover at least a part of the coil as viewed in a direction parallel to the optical axis and as viewed in the direction perpendicular to the optical axis. At least a part of the first shield member being arranged closer to an image plane than the coil, and a predetermined conditional expression is satisfied.

17 Claims, 20 Drawing Sheets

(56) References Cited

U.S. PATENT DOCUMENTS

| | | | |
|---|---|---|---|
| 8,224,169 B2* | 7/2012 | Tsuruta | H04N 5/2257 |
| | | | 396/55 |
| 10,423,006 B2* | 9/2019 | Taguchi | H01F 7/064 |
| 10,712,177 B2* | 7/2020 | Umehara | G02B 7/08 |
| 2006/0034599 A1* | 2/2006 | Osaka | G03B 13/36 |
| | | | 396/144 |
| 2011/0097062 A1* | 4/2011 | Tsuruta | G02B 27/646 |
| | | | 396/55 |
| 2016/0014339 A1 | 1/2016 | Miller | |
| 2016/0109721 A1* | 4/2016 | Min | G02B 7/08 |
| | | | 359/557 |
| 2018/0164603 A1 | 6/2018 | Taguchi | |
| 2018/0213131 A1* | 7/2018 | Liu | G03B 17/02 |
| 2019/0107684 A1* | 4/2019 | Osaka | G03B 5/04 |
| 2019/0115818 A1* | 4/2019 | Yu | H02K 11/022 |

FOREIGN PATENT DOCUMENTS

| | | |
|---|---|---|
| JP | 2006171346 A | 6/2006 |
| JP | 201357872 A | 3/2013 |
| JP | 2013218015 A | 10/2013 |
| JP | 2014-016572 A | 1/2014 |
| JP | 2015-169883 A | 9/2015 |
| JP | 2018-136570 A | 8/2018 |

\* cited by examiner

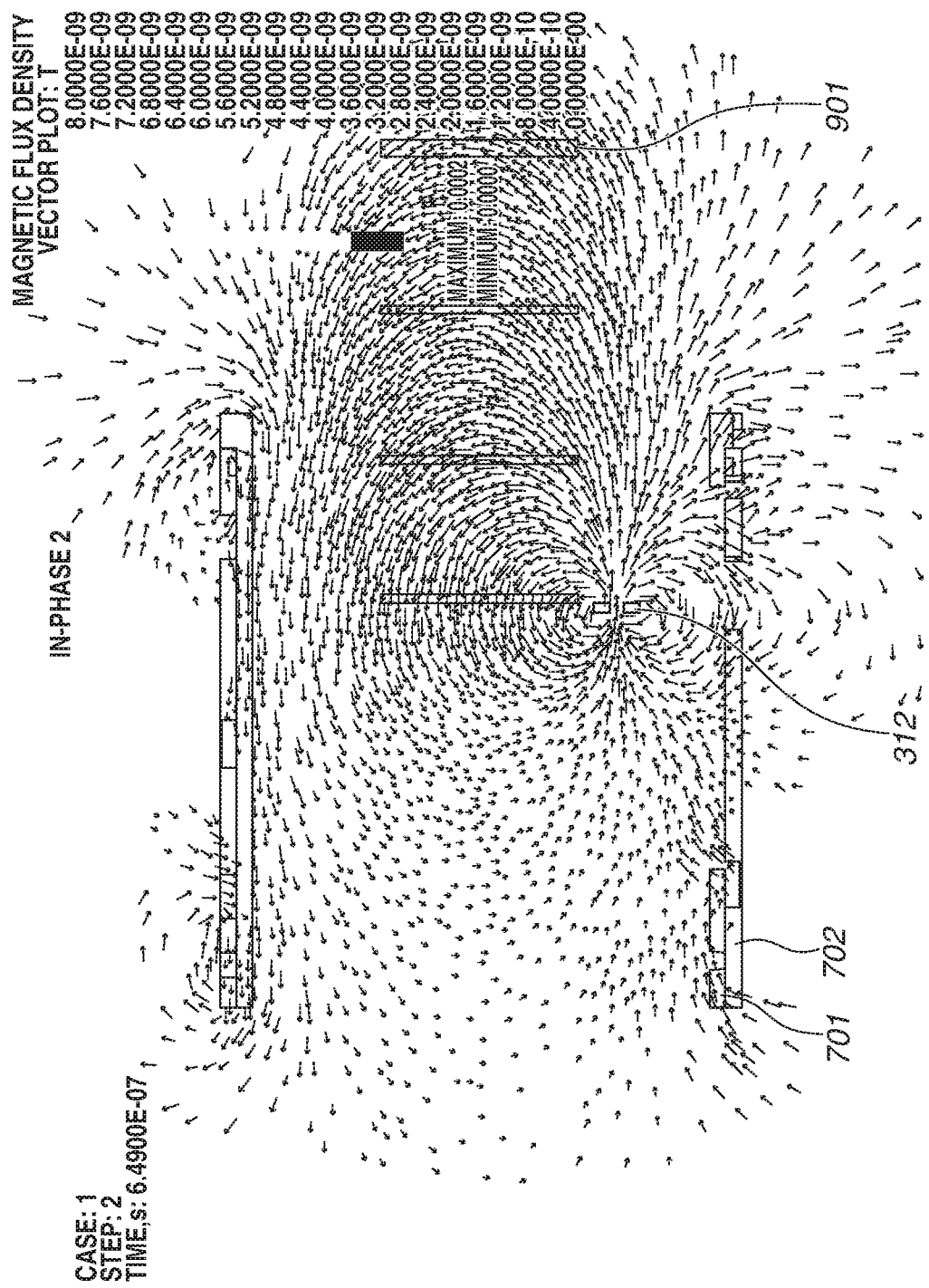

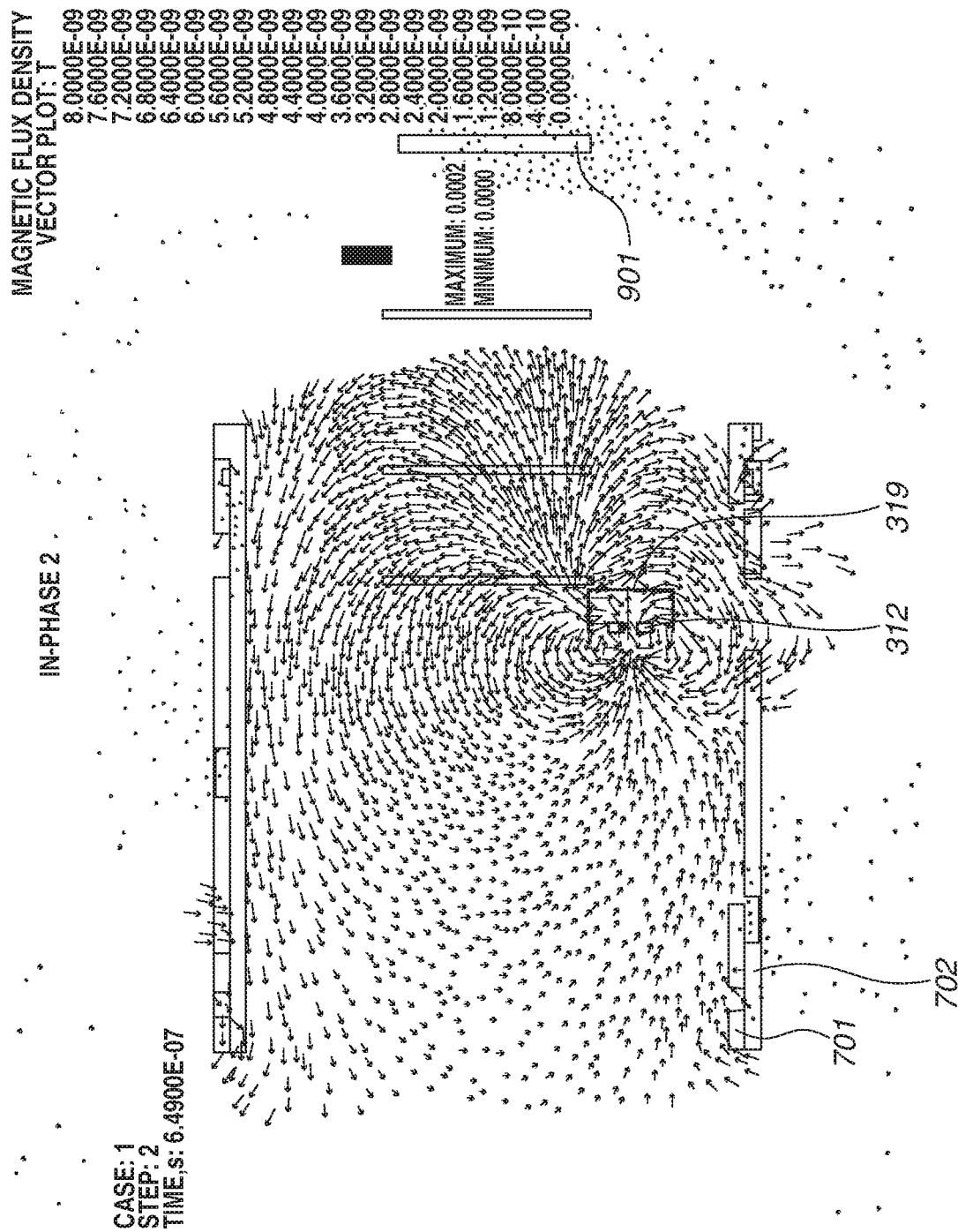

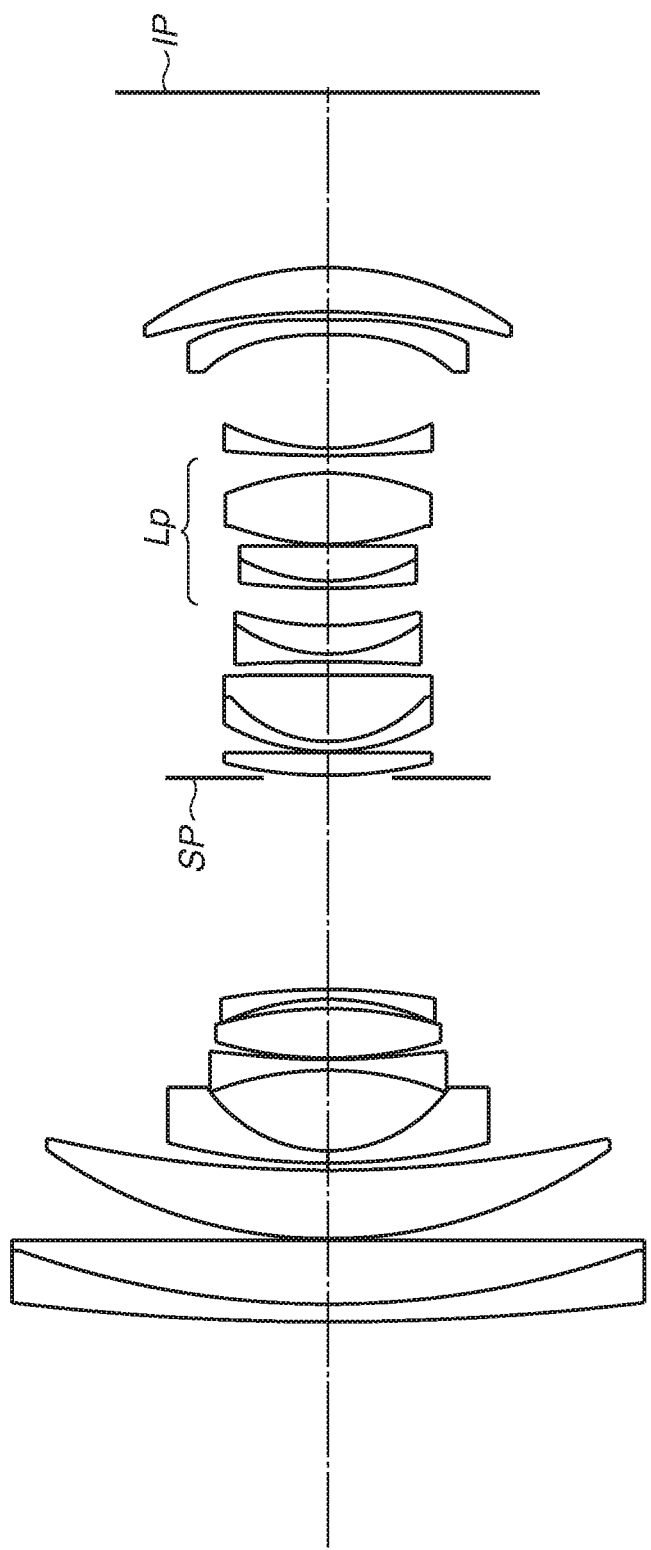

LENS APPARATUS AND IMAGING SYSTEM INCLUDING THE SAME

BACKGROUND

Field

The present disclosure relates to a lens apparatus and an imaging system including the lens apparatus.

Description of the Related Art

An interchangeable lens (lens apparatus) which includes an image stabilization unit including a lens and a voice coil motor (VCM) and is attached to a camera body including an image sensor is widely known. When the interchangeable lens is attached to the camera body and a coil included in the VCM is energized, magnetic noise generated from the coil reaches the image sensor. This may result in image quality deterioration in a captured image.

To deal with such a phenomenon, a camera system (an imaging system comprises a lens apparatus and a camera body) discussed in Japanese Patent Application Laid-Open No. 2015-169883 suspends an operation of an image stabilization unit during a period in which an electric charge accumulated in an image sensor is read out.

The camera system discussed in Japanese Patent Application Laid-Open No. 2015-169883 described above may suppress image quality deterioration in a captured image due to the magnetic noise described above. However, Japanese Patent Application Laid-Open No. 2015-169883 fails to disclose any configuration for reducing the amount of magnetic noise that reaches the image sensor.

SUMMARY

Accordingly, the present disclosure is directed to providing a lens apparatus capable of reducing the amount of magnetic noise that reaches an image sensor, and an imaging system including the lens apparatus.

According to an aspect of the present disclosure, a lens apparatus includes an imaging optical system including a plurality of lenses, a movable member holding at least one lens among the plurality of lenses and configured to move in a direction including a component perpendicular to an optical axis of the imaging optical system, a fixed member whose movement in the direction is restricted, a coil provided at one of the movable member or the fixed member and configured to move the movable member in the direction, a magnet provided at the other of the movable member or the fixed member and configured to move the movable member in the direction, and a first shield member configured to cover at least a part of the coil as viewed in a direction parallel to the optical axis and as viewed in the direction perpendicular to the optical axis, at least a part of the first shield member being arranged closer to an image plane than the coil, wherein the imaging optical system includes a lens unit having a positive refractive power and arranged closer to the image plane than the at least one lens, the lens unit being fixed while the movable member moves in the direction, and wherein the lens apparatus satisfies the following expression:

$$0.8 \leq |fis/fp| \leq 8.0$$

where a focal length of the at least one lens is represented by fis, and a focal length of the lens unit is represented by fp.

Further features of the present disclosure will become apparent from the following description of exemplary embodiments with reference to the attached drawings.

BRIEF DESCRIPTION OF THE DRAWINGS

FIGS. 7A and 7B are diagrams each illustrating a magnetic field simulation result obtained during image stabilization according to the first exemplary embodiment.

FIG. 16 is a sectional view illustrating lenses an optical system according to a second numerical example.

DESCRIPTION OF THE EMBODIMENTS (Electrical Configuration of Camera System)

Figure 1:
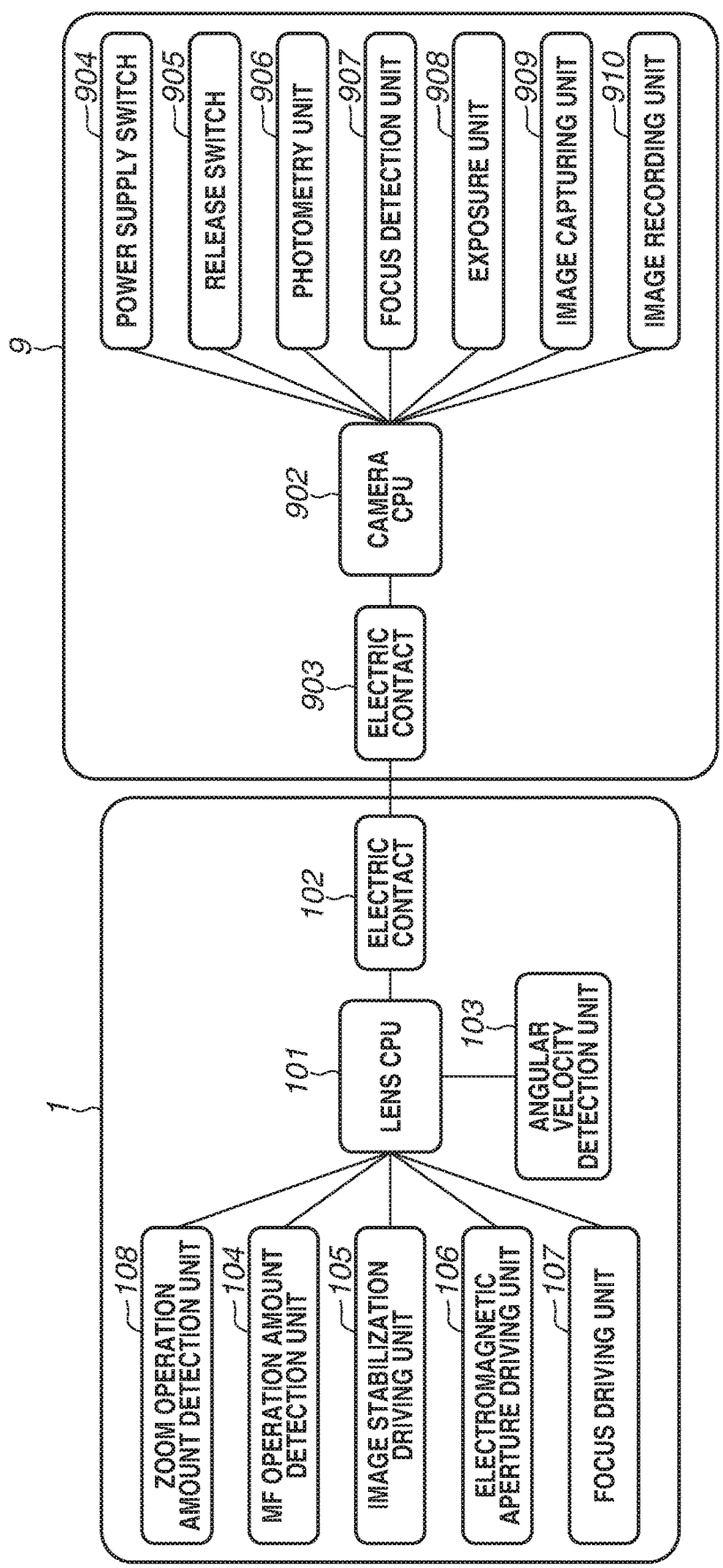
FIG. 1 is a diagram illustrating an electrical configuration of a camera system according to each exemplary embodiment.

First, an electrical configuration of a camera system (an imaging system) including an interchangeable lens (lens apparatus) 1 and a camera body (imaging apparatus) 9 will be described with reference to FIG. 1. The interchangeable lens 1 corresponds to each interchangeable lens described in the following exemplary embodiments.

(Electrical Configuration of Camera Body)

A camera central processing unit (CPU) 902 is composed of a microcomputer and serves as a camera control unit (first control unit) that controls the operation of each unit in the camera body 9. The camera CPU 902 also serves as a communication unit (first communication unit) of the camera body 9 that communicates with a lens CPU 101, which is provided in the interchangeable lens 1, via an electric contact 102 and an electric contact 903 when the interchangeable lens 1 is attached to the camera body 9.

Information (signal) to be transmitted from the camera CPU 902 to the lens CPU 101 includes information about a driving amount of a focus lens and image stabilization information. Information (signal) to be transmitted from the lens CPU 101 to the camera CPU 902 further includes image-capturing magnification information. The electric contact 102 and the electric contact 903 further include an electric contact for supplying power from the camera body 9 to the interchangeable lens 1, in addition to the electric contact for communication between the camera body 9 and the interchangeable lens 1.

A power supply switch 904 is a power supply switch that can be operated by a user. The power supply switch 904 is a switch for activating the camera CPU 902 and starting power supply to an actuator, a sensor, and the like in a camera system.

A release switch 905 is a switch that can be operated by the user. The release switch 905 includes a first stroke switch SW1 and a second stroke switch SW2. A signal output from the release switch 905 is input to the camera CPU 902.

The camera CPU 902 shifts to an image-capturing preparation state in response to an ON signal input from the first stroke switch SW1. In the image-capturing preparation state, a photometry unit 906 measures object luminance and a focus detection unit 907 performs focus detection. The camera CPU 902 calculates an aperture value of an aperture unit 33, the amount of exposure (shutter speed) of an image sensor 901, and the like, based on the photometry result. Light from the interchangeable lens 1 is incident on the image sensor 901. In other words, the image sensor 901 receives light from the interchangeable lens 1.

Further, the camera CPU 902 determines the driving amount to bring a focus lens to an in-focus state on an object, based on focus information (defocus amount) about an imaging optical system obtained by the focus detection unit 907. In a first exemplary embodiment to be described below, the focus lens corresponds to a 16th lens L16, and the lens L16 is held by a fourth-group lens barrel 40. Information about the driving amount of the focus lens (focus lens driving amount information) is transmitted to the lens CPU 101. The lens CPU 101 causes the focus lens to be driven based on the focus lens driving amount information received from the camera body 9.

The camera CPU 902 starts controlling an image stabilization operation of an image stabilization apparatus (image stabilization unit) in a predetermined image capturing mode. In the first exemplary embodiment to be described below, a 3B-group lens barrel unit 31 corresponds to the image stabilization apparatus.

Upon receiving the ON signal from the second stroke switch SW2, the camera CPU 902 transmits an aperture drive instruction to the lens CPU 101. The lens CPU 101 drives an aperture unit (aperture unit 33 in the first exemplary embodiment to be described below) based on the aperture drive instruction from the camera CPU 902, to adjust an aperture value to the value instructed from the camera CPU 902.

When information indicating the end of driving of the aperture unit 33 and information indicating a time required for driving the aperture unit 33 are transmitted from the lens CPU 101 to the camera CPU 902, the camera CPU 902 transmits an exposure start instruction to an exposure unit 908. As a result, an operation for retracting a mirror (not illustrated) and an operation for releasing a shutter (not illustrated) are carried out, and an image capturing unit 909 (image sensor 901 in the first exemplary embodiment to be described below) performs a photoelectric conversion operation, i.e., an exposure operation, on an object image.

An image capturing signal output from the image capturing unit 909 is converted into a digital signal by a signal processing unit in the camera CPU 902, and is then subjected to various correction processes and output as an image signal (data). An image recording unit 910 records and stores the image signal in a recording medium. Examples of the recording medium include a semiconductor memory, such as a flash memory, a magnetic disk, and an optical disk.

(Electrical Configuration of Interchangeable Lens)

A zoom operation amount detection unit 108 detects the rotation amount of a zoom ring 705, which is described below, by using a sensor (not illustrated). A manual focus (MF) operation amount detection unit 104 detects the rotation amount of an MF ring 704, which is described below, by using a sensor (not illustrated).

An image stabilization driving unit 105 includes a drive actuator for the image stabilization apparatus, and a drive circuit for the drive actuator. An electromagnetic aperture driving unit 106 is controlled by the lens CPU 101 receiving the aperture drive instruction from the camera CPU 902, and drives the aperture unit 33 into an open state corresponding to a designated aperture value. A focus driving unit 107 drives the focus lens by using a focus driving mechanism (focus driving mechanism 34 in the first exemplary embodiment to be described below) based on focus driving amount information transmitted from the camera CPU 902.

An angular velocity detection unit 103 includes an angular velocity sensor (angular velocity sensor 706 in the first exemplary embodiment to be described below). The angular velocity detection unit 103 detects a longitudinal (pitch-direction) shake and a lateral (yaw-direction) shake, which are angle shakes, by using the angular velocity sensor, and outputs the angular velocity of each shake to the lens CPU 101. The lens CPU 101 electrically or mechanically integrates angular velocity signals in the pitch direction and the yaw direction input from the angular velocity sensor, and calculates the amount of shake in the pitch direction and the amount of shake in the yaw direction as the amount of displacement in each direction. Further, the lens CPU 101 controls the image stabilization driving unit 105 based on the displacement amount obtained by combining the amount of shake in the pitch direction and the amount of shake in the yaw direction described above, and performs the image stabilization by shifting the image stabilization apparatus (driving the image stabilization apparatus in a direction crossing an optical-axis direction).

First Exemplary Embodiment

Figure 2:
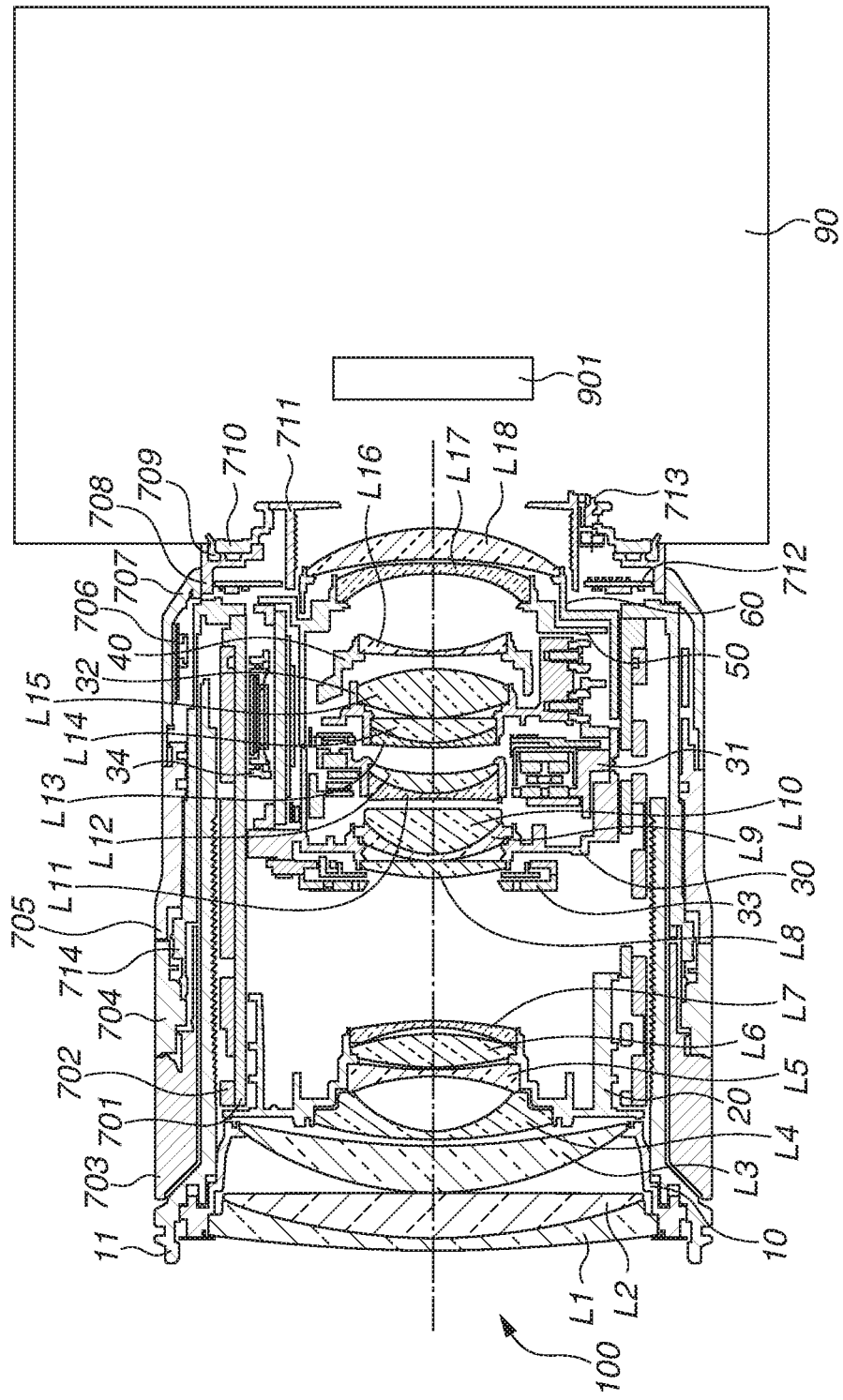
FIG. 2 is a sectional view illustrating a lens apparatus in a wide-angle end state according to a first exemplary embodiment.
Figure 3:
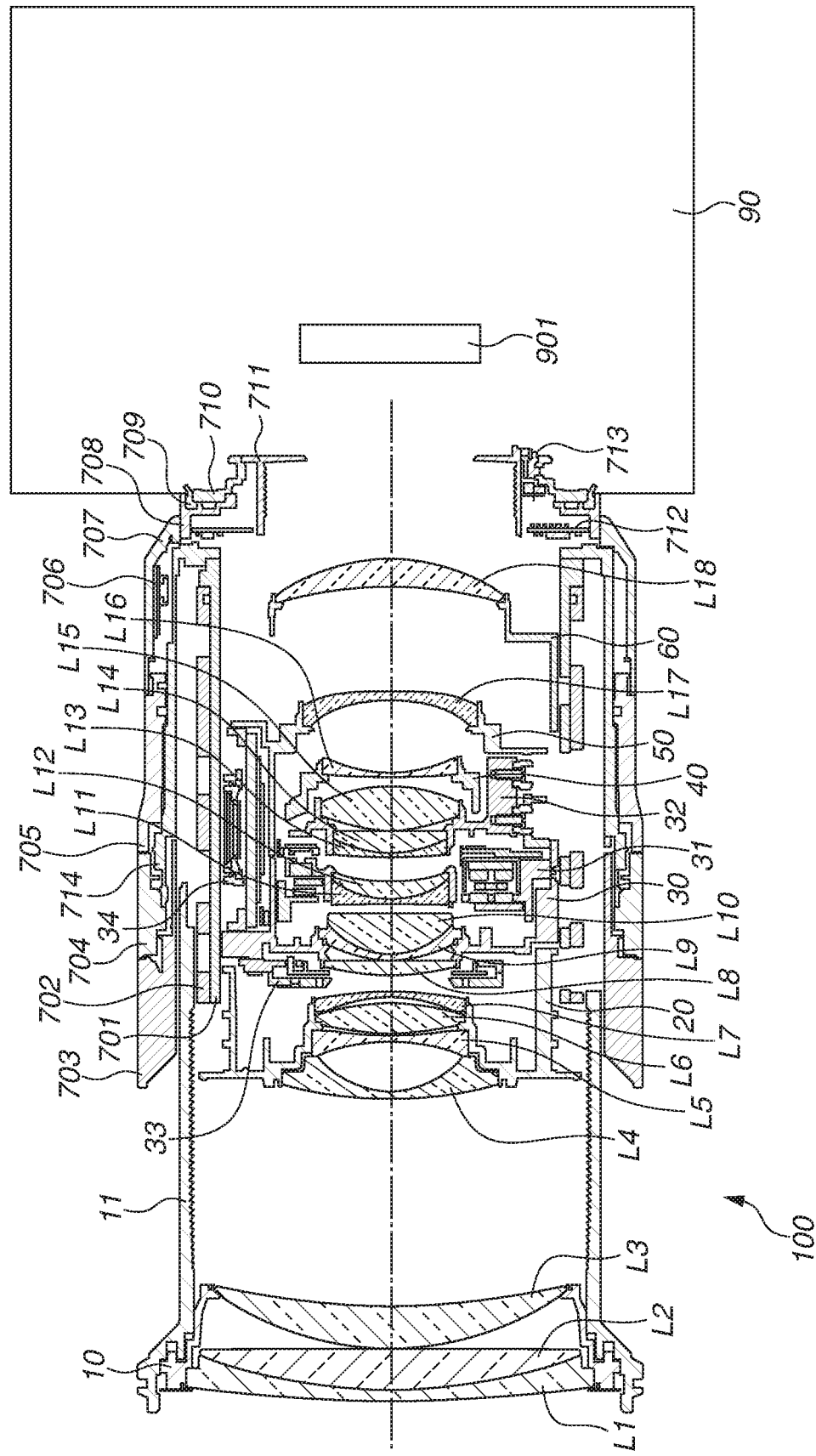
FIG. 3 is a sectional view illustrating the lens apparatus in a telephoto-end state according to the first exemplary embodiment.

A configuration of an interchangeable lens 100 according to the first exemplary embodiment will be described with reference to FIGS. 2 and 3. FIG. 2 is a sectional view illustrating the interchangeable lens 100 at a wide-angle end. FIG. 3 is a sectional view illustrating the interchangeable lens 100 at a telephoto end. The electrical configuration of the interchangeable lens 100 is similar to that of the interchangeable lens 1 described above.

(Configuration for Holding Lenses)

A first-group lens barrel 10 holds a first lens L1, a second lens L2, and a third lens L3. The first-group lens barrel 10 is fixed to a first-group barrel 11. A second-group lens barrel 20 holds a fourth lens L4, a fifth lens L5, a sixth lens L6, and a seventh lens L7. A 3A-group lens barrel 30 holds an eighth lens L8, a ninth lens L9, and a tenth lens L10. The 3B-group lens barrel unit 31 is an image stabilization apparatus that holds an 11th lens L11 and a 12th lens L12 and moves the 11th lens L11 and the 12th lens L12 on a plane vertical to the optical axis, to correct a so-called image blurring due to hand shake. A 3C-group lens barrel 32 holds a 13th lens L13, a 14th lens L14, and a 15th lens L15.

The fourth-group lens barrel 40 holds the 16th lens L16. A fifth-group lens barrel 50 holds a 17th lens L17. A sixth-group lens barrel 60 holds an 18th lens L18. The 3B-group lens barrel unit 31 is fixed to the 3A-group lens barrel 30. The 3C-group lens barrel 32 is fixed to the fifth-group lens barrel 50.

In the present exemplary embodiment, a set of the first lens L1, the second lens L2, and the third lens L3 is referred to as a first lens group or a first lens unit. A set of the fourth lens L4, the fifth lens L5, the sixth lens L6, and the seventh lens L7 is referred to as a second lens group or a second lens unit. A set of the eighth lens L8, the ninth lens L9, the tenth lens L10, the 11th lens L11, the 12th lens L12, the 13th lens L13, the 14th lens L14, and the 15th lens L15 is referred to as a third lens group or a third lens unit. The 16th lens L16 is referred to as a fourth lens group or a fourth lens unit. The 17th lens L17 is referred to as a fifth lens group or a fifth lens unit. The 18th lens L18 is referred to as a sixth lens group or a sixth lens unit.

In the present exemplary embodiment, the first lens group has a positive refractive power, the second lens group has a negative refractive power, the third lens group has a positive refractive power, and the fourth lens group has a negative refractive power. The fifth lens group has a negative refractive power, and the sixth lens group has a positive refractive power.

The lens groups are configured in such a manner that an interval between adjacent lens groups varies during zooming. In other words, each boundary between lens groups is within the interval between lenses that varies during zooming.

As described above, the imaging optical system mounted on the lens apparatus includes a plurality of lenses. At least one of the plurality of lenses is held by a 3B-group lens barrel 311 as described below. The imaging optical system according to the present exemplary embodiment and an imaging optical system according to a second exemplary embodiment to be described below are zoom lenses capable of zooming.

(Configuration for Driving Focus Lens Unit)

The 16th lens L16 is a focus lens (focus lens unit) that moves in the optical-axis direction during focusing. In the present exemplary embodiment, only the 16th lens L16 moves during focusing, but instead a plurality of lenses may move in an integrated manner during focusing. Alternatively, the interchangeable lens 100 may include a first focus lens and a second focus lens which move with different trajectories during focusing.

The fourth-group lens barrel 40 holding the 16th lens L16 is held to be movable in the optical-axis direction by a guide mechanism (not illustrated) that is held between the 3A-group lens barrel 30 and the fifth-group lens barrel 50. The fourth-group lens barrel 40 is moved in the optical-axis direction during focusing by the focus driving mechanism 34 that is fixed to the fifth-group lens barrel 50. With such a configuration, a focusing operation (focusing) is carried out. As described below, the fourth-group lens barrel 40 moves in the optical-axis direction not only during focusing, but also during zooming. The focus driving mechanism 34 includes an actuator such as an ultrasonic motor or a stepping motor.

A guide barrel 701 has a plurality of straight grooves each extending in the optical-axis direction. A cam ring 702 is rotatably fit to the outer periphery of the guide barrel 701. A fixing barrel 714 fixes (holds) the guide barrel 701. On a printed circuit board 712, an integrated circuit (IC) for driving the interchangeable lens 1, a microcomputer, and the like are arranged. The printed circuit board 712 is fixed to the fixing barrel 714.

The MF ring 704 is held between a front ring 703 and the fixing barrel 714 and is held to be rotatable around the fixing barrel 714. When the MF ring 704 is rotated, the rotation is detected by a sensor (not illustrated), and the printed circuit board 712 controls the focus driving mechanism 34 based on the amount of rotation.

(Configuration for Driving Zoom Lens Unit)

Next, a configuration for driving (moving) a zoom lens unit that moves in the optical-axis direction during zooming will be described. Each of the first to sixth lens units according to the present exemplary embodiment corresponds to the zoom lens unit.

The zoom ring 705 is held between the fixing barrel 714 and an exterior barrel 707 and is supported to be rotatable around the fixing barrel 714. The exterior barrel 707 is fixed to the fixing barrel 714. The zoom ring 705 is coupled to the cam ring 702 by a key (not illustrated). Accordingly, when a user rotationally operates the zoom ring 705, the cam ring 702 rotates. The amount of rotational operation of the zoom ring 705 is detected by a sensor (not illustrated), and the detection result obtained by the sensor is acquired by the IC of the printed circuit board 712 so that the printed circuit board 712 can control focusing, image stabilization, and aperture driving for each focal length.

When the cam ring 702 is rotated by rotationally operating the zoom ring 705, each lens barrel moves in the optical-axis direction in the following manner.

A movement during zooming of the first-group lens barrel 10 will be described. A roller (not illustrated) that is installed in the first-group barrel 11 engages with each of cam grooves in the cam ring 702 and straight grooves in the guide barrel 701. Accordingly, when the cam ring 702 rotates about the optical axis, the first-group barrel 11 moves in the optical-axis direction. As a result, the first-group lens barrel 10 held by the first-group barrel 11 and the lenses provided in the first-group lens barrel 10 move in the optical-axis direction.

A movement during zooming of the second-group lens barrel 20 will be described. A roller (not illustrated) that is installed in the second-group lens barrel 20 engages with each of cam grooves in the cam ring 702 and straight grooves in the guide barrel 701. Accordingly, when the cam ring 702 rotates about the optical axis, the second-group lens barrel 20 and the lenses provided in the second-group lens barrel 20 move in the optical-axis direction.

A movement during zooming of the 3A-group lens barrel 30, the 3B-group lens barrel unit 31, the 3C-group lens barrel 32, the fourth-group lens barrel 40, and the fifth-group lens barrel 50 will be described. A roller (not illustrated) installed in the 3A-group lens barrel 30 engages with each of cam grooves in the cam ring 702 and straight grooves in the guide barrel 701. Accordingly, when the cam ring 702 rotates about the optical axis, the 3A-group lens barrel 30 moves in the optical-axis direction. As a result, not only the 3A-group lens barrel 30, but also the 3B-group lens barrel unit 31, the 3C-group lens barrel 32, the fourth-group lens barrel 40, and the fifth-group lens barrel 50, which are held by the 3A-group lens barrel 30 or are integrally formed with the 3A-group lens barrel 30, move in the optical-axis direction.

The fourth-group lens barrel 40 moves in the optical-axis direction by the rotation of the cam ring 702 about the optical axis, and also moves in the optical-axis direction so that a displacement in focus position can be suppressed by the focus driving mechanism 34 during zooming. In other words, the interval between the fourth-group lens barrel 40 and the 3C-group lens barrel 32 and the interval between the fourth-group lens barrel 40 and the fifth-group lens barrel 50 at the wide-angle end are different from those at the telephoto end.

A movement of the sixth-group lens barrel 60 during zooming will be described. A roller (not illustrated) installed in the sixth-group lens barrel 60 engages with each of cam grooves in the cam ring 702 and straight grooves in the guide barrel 701. Accordingly, when the cam ring 702 rotates about the optical axis, the sixth-group lens barrel 60 moves in the optical-axis direction.

With the configuration described above, the interval between the lens barrels varies during zooming. Accordingly, image capturing in a focal length range from the wide-angle end to the telephoto end becomes possible.

(Other Configurations)

The aperture unit 33 is an aperture unit that adjusts the amount of light and is fixed to the 3A-group lens barrel 30.

The angular velocity sensor 706 is fixed to the fixing barrel 714. The angular velocity sensor 706 is electrically connected to the printed circuit board 712. The image stabilization is performed by the 3B-group lens barrel unit 31 based on the angular velocity detected by the angular velocity sensor 706.

A mount ring 708 is fixed to the fixing barrel 714 in such a manner that the mount ring 708 is held between the fixing barrel 714 and a mount 710. A mount rubber 709 is held between the mount 710 and the mount ring 708 at the inner periphery of the mount ring 708. A back lid 711 is fixed to the mount 710. A contact block 713 is electrically connected to the printed circuit board 712 with a wire (a flexible printed circuit board or the like) (not illustrated) and is fixed to the mount 710.

The interchangeable lens 100 is fixed by bayonet connection to the camera body 9 with the mount 710. When the interchangeable lens 1 is fixed to the camera body 9, the printed circuit board 712 that controls the operation of each lens can communicate with the camera body 9 via the contact block 713.

The camera body 9 includes the image sensor 901. The image sensor 901 is a photoelectric conversion element, such as a complementary metal-oxide semiconductor (CMOS) sensor or a charge-coupled device (CCD) sensor, which receives the light having passed through the interchangeable lens 1 from the object, and converts the light into an electric signal.

(Configuration of Image Stabilization Apparatus)

Figure 4:
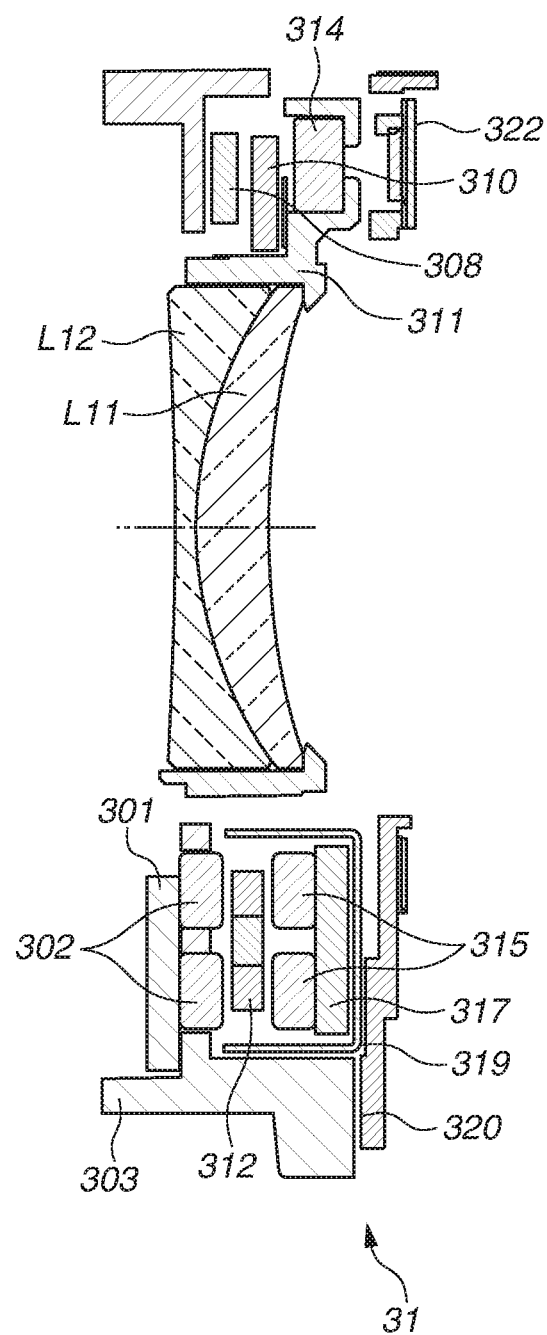
FIG. 4 is a sectional view illustrating an image stabilization apparatus according to the first exemplary embodiment.
Figure 5:
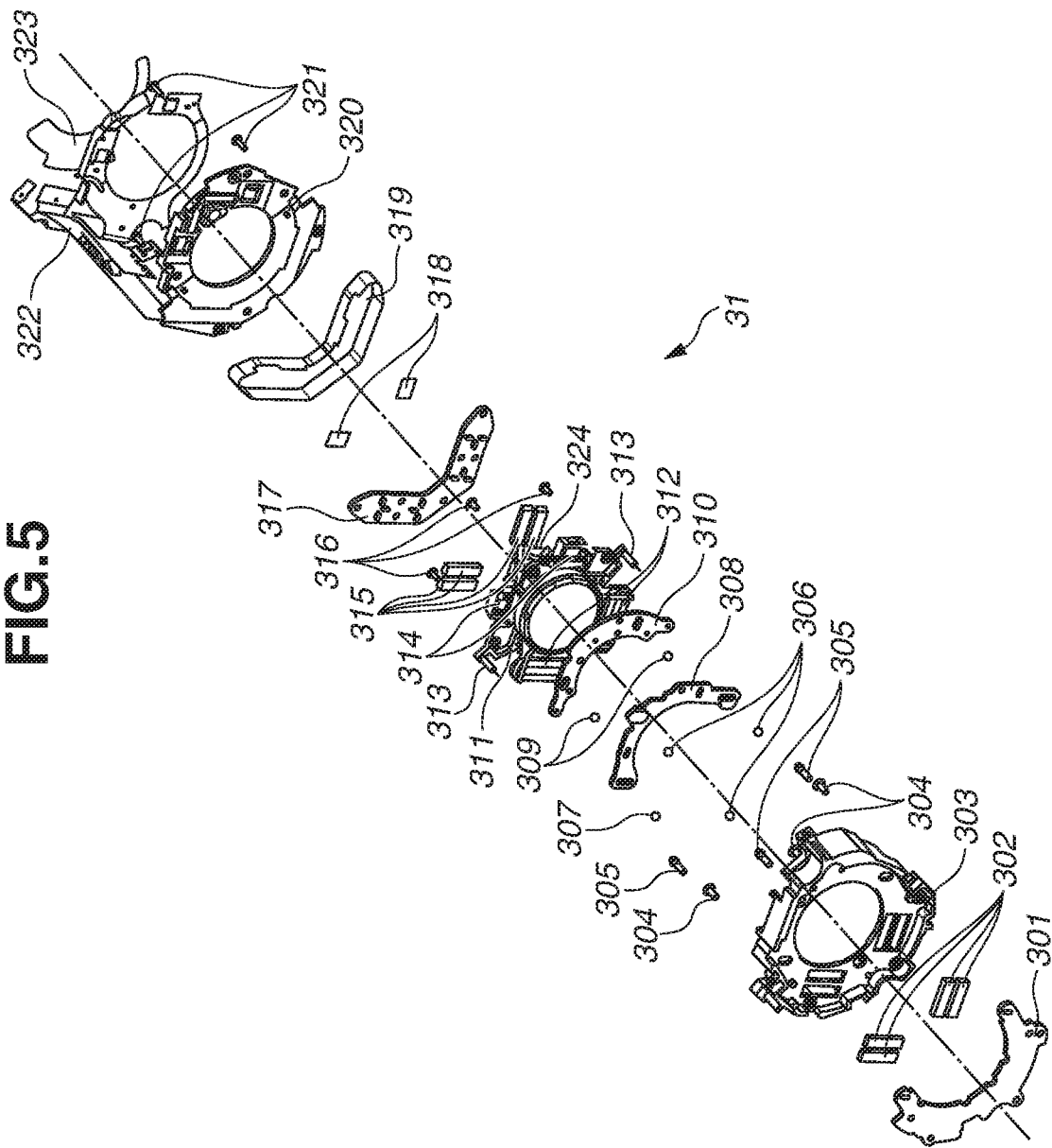
FIG. 5 is an exploded perspective view illustrating the image stabilization apparatus according to the first exemplary embodiment.
Figure 6:
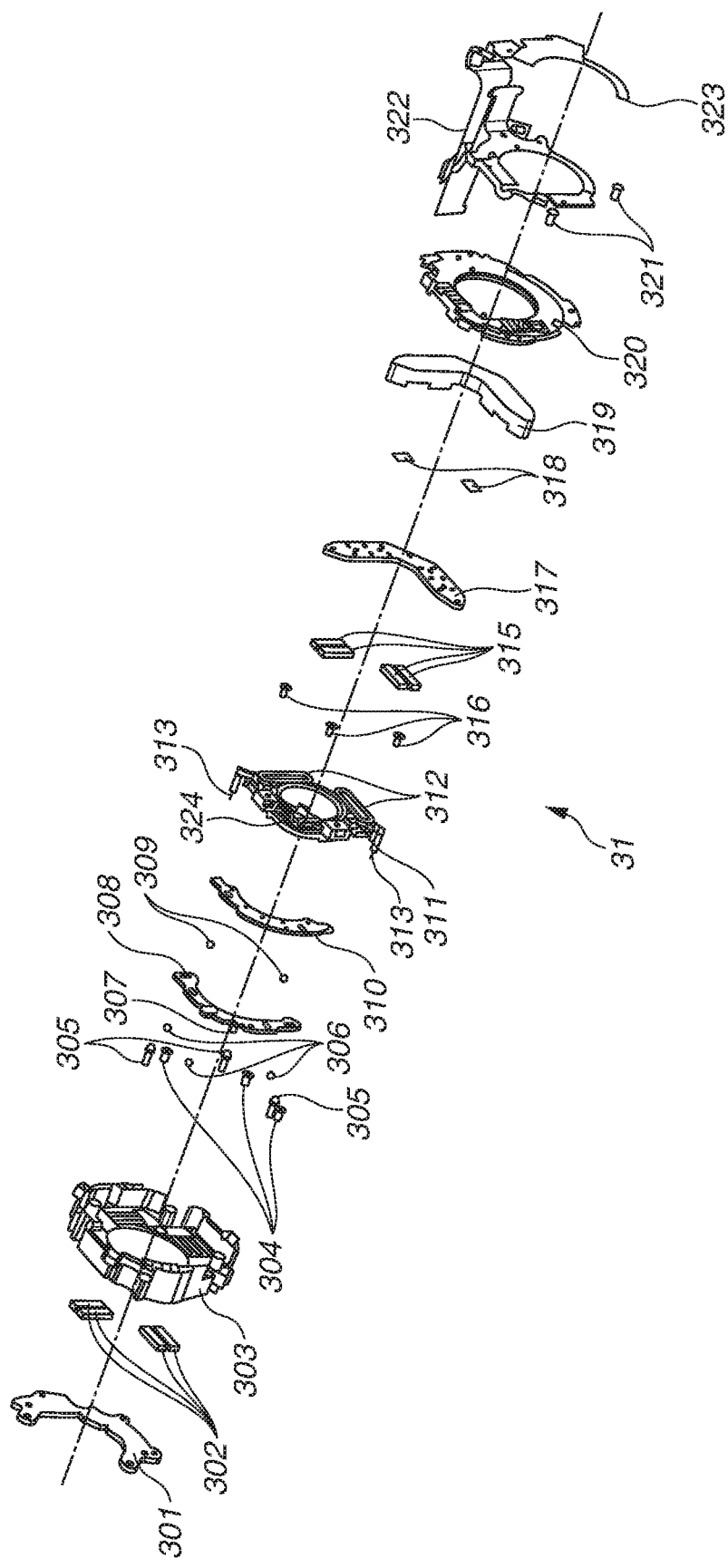
FIG. 6 is an exploded perspective view illustrating the image stabilization apparatus according to the first exemplary embodiment.

Next, the configuration of the 3B-group lens barrel unit 31, which is an image stabilization apparatus (image stabilization unit), will be described with reference to FIGS. 4 to 7B. FIG. 4 is a sectional view of the 3B-group lens barrel unit 31. FIGS. 5 and 6 are exploded perspective views of the 3B-group lens barrel unit 31. FIGS. 7A and 7B are diagrams each illustrating a result of simulating a magnetic field generated from coils 312 during image stabilization driving of the 3B-group lens barrel unit 31.

A first yoke (yoke) 301, which is formed of a magnetic material, is screwed into a ground plate (fixed member) 303 with fixing screws 304. First drive magnets (magnets) 302 are fixed to the first yoke 301 by magnetic attraction through openings formed in the ground plate 303. That is, the first drive magnets 302 is provided on the ground plate 303. The first drive magnets 302 is a permanent magnet composed of a neodymium magnet.

The 3B-group lens barrel (movable member) 311 holds the 11th lens L11 and the 12th lens L12. The 11th lens L11 and the 12th lens L12, which are held by the 3B-group lens barrel 311, move on a plane vertical to the optical axis (in a direction perpendicular to the optical axis), to correct a so-called image burring due to hand shake. The direction in which the 3B-group lens barrel 311 moves need not be identical to the direction perpendicular to the optical axis, as long as an angle formed by the 3B-group lens barrel 311 with respect to the optical axis falls within a range of 90±5 degrees. Alternatively, the direction in which the 3B-group lens barrel 311 moves may be a direction crossing the optical axis. The movement of the ground plate 303 in the direction crossing the optical axis is restricted. Accordingly, even when the 3B-group lens barrel 311 moves in the direction crossing the optical axis, the ground plate 303 does not move in the direction crossing the optical axis.

The coils 312 and position detection magnets 314 are each fixed to the 3B-group lens barrel 311. Further, a first guide plate 310 is screwed into the 3B-group lens barrel 311 with fixing screws 316.

A second guide plate 308 is supported to be movable in the pitch direction within a plane perpendicular to the optical axis with respect to the ground plate 303 by first rolling balls 306. The 3B-group lens barrel 311 to which the first guide plate 310 is fixed is supported to be movable in the yaw direction, which is perpendicular to the optical axis, by second rolling balls 309 with respect to the second guide plate 308. The 3B-group lens barrel 311 to which the first guide plate 310 is fixed is supported to be movable in the pitch direction (first direction), which is perpendicular to the optical axis, and in the yaw direction (second direction) by a third rolling ball 307 with respect to the ground plate 303.

The 3B-group lens barrel 311 is constantly pulled toward the ground plate 303 by tensile springs 313. Accordingly, the 3B-group lens barrel 311 is movable within the plane perpendicular to the optical axis. More specifically, the 3B-group lens barrel 311 can be moved in the direction crossing the optical axis, while the rotation about the optical axis of the 3B-group lens barrel 311 is suppressed by the guide plates, the rolling balls, and the tensile springs described above.

A second yoke (yoke) 317 is fixed to second drive magnets (magnets) 315 by magnetic attraction, while the second drive magnets 315 are positioned using a protrusion provided on the second yoke 317. The position in the optical-axis direction of the second yoke 317 is determined by the first yoke 301 and pillars 305. The first yoke 301 and the second yoke 317 hold the pillars 305. A magnetic attraction force is generated between the first drive magnets 302 and the second drive magnets 315. Accordingly, the first yoke 301 and the second yoke 317 are to move in a direction in which the first yoke 301 and the second yoke 317 approach each other by the magnetic attraction force generated between two drive magnets. The gap between the two yokes in the optical-axis direction is determined by the pillars 305, and is set to a predetermined value.

The first drive magnets 302 and the second drive magnets 315 are arranged to face the coils 312 which are fixed to the 3B-group lens barrel 311.

A first shield plate (magnetic shield, shield member) 319 is fixed by adhesion to the second yoke 317 with double-sided adhesive tapes 318. The first shield plate 319 is made of a material which is non-magnetic and has a small electric resistance (high conductivity), such as copper or aluminum. The configuration of the first shield plate 319 will be described in more detail below.

A first flexible substrate 322 including a hall sensor for position detection is fixed to a sensor holding plate 320. The sensor holding plate 320 is fixed to the ground plate 303 by joint tightening using a retaining plate 323 and fixing screws 321. The first flexible substrate 322 is electrically connected to the printed circuit board 712.

A second flexible substrate 324 is electrically connected to the coils 312 by soldering. An end of the second flexible substrate 324 is electrically connected to a connector portion provided on the first flexible substrate 322.

The hall sensor included in the first flexible substrate 322 converts a magnetic flux density of each of the position detection magnets 314 into an electric signal. When the 3B-group lens barrel 311 is driven, a variation in the magnetic flux density from the position detection magnets 314 is detected by the hall sensor, and the electric signal corresponding to the variation in the magnetic flux density is output from the hall sensor. The position of the 3B-group lens barrel 311 can be detected based on the electric signal.

When a current flows through the coils 312, the Lorentz force is generated at the first drive magnets 302 and the second drive magnets 315. The generated Lorentz force moves the 3B-group lens barrel 311 within the plane perpendicular to the optical axis (in the direction crossing the optical axis).

The coils 312, the first drive magnets 302, and the second drive magnets 315 are each provided in such a manner that either one of the member is arrange in a direction perpendicular to a direction in which the other one of the member is arranged. In other words, the coils 312 include a first coil for moving the 3B-group lens barrel 311 in the yaw direction (first direction), and a second coil for moving the 3B-group lens barrel 311 in the pitch direction (second direction). The first drive magnets 302 include a first magnet for moving the 3B-group lens barrel 311 in the yaw direction, and a second magnet for moving the 3B-group lens barrel 311 in the pitch direction. The second drive magnets 315 include a third magnet for moving the 3B-group lens barrel 311 in the yaw direction, and a fourth magnet for moving the 3B-group lens barrel 311 in the pitch direction.

Accordingly, the 3B-group lens barrel 311 can freely move within a predetermined range within the plane perpendicular to the optical axis by a combined force of the drive force in the yaw direction and the drive force in the pitch direction. The interchangeable lens 100 includes the first drive magnets 302 and the second drive magnets 315. However, the interchangeable lens 100 may be configured to include only the first drive magnets 302 or the second drive magnets 315.

(Configuration of Magnetic Shield)

Next, the configuration of the first shield plate 319 will be described in detail. As illustrated in FIG. 4, the first shield plate 319 is arranged to cover the coils 312. More specifically, surfaces of the coils 312 on the side of the image sensor 901 as viewed in the optical-axis direction are covered by the first shield plate 319, and surfaces of the coils 312 in the thickness direction in which the coils 312 are wound are also covered. In other words, the first shield plate 319 covers at least a part of each of the coils 312 as viewed in a direction parallel to the optical axis and as viewed in the direction crossing the optical axis. At least a part of the first shield plate 319 is arranged closer to an image plane than each of the coils 312 in the imaging optical system.

The use of the first shield plate 319 having the configuration described above makes it possible to achieve an interchangeable lens capable of reducing the amount of magnetic noise that reaches the image sensor 901 as described below.

(Results of Simulating Magnetic Field Generated from Coil)

Results of simulating a magnetic field generate from the coils 312 will be described with reference to FIGS. 7A and 7B. FIGS. 7A and 7B each illustrate the result of simulating the magnetic field generated from the coils 312 during image stabilization driving of the 3B-group lens barrel unit 31. More specifically, FIGS. 7A and 7B each illustrate the result of simulating a variation in magnetic flux density when a current that varies in positive and negative directions at a high frequency (about several tens of kHz) flows through the coils 312. FIG. 7A illustrates the result obtained when the first shield plate 319 is not provided, and FIG. 7B illustrates the result obtained when the first shield plate 319 is provided.

As seen from the result illustrated in FIG. 7A, a fluctuation in the magnetic field (magnetic flux density) that is generated when a current flows through the coils 312 for image stabilization is generated at the position of the image sensor 901. Thus, the fluctuation in the magnetic field (magnetic flux density) at the position of the image sensor 901 causes a deterioration in the image quality indicated by the image signal. More specifically, the magnetic field that varies at a high frequency (about several tens of kHz) penetrates through a signal line for pixel charge information for retrieving the image signal from the image sensor 901. As a result, magnetism is generated due to electromagnetic induction in the signal line, which may result in generating noise in the signal line for the pixel charge information. However, in the image stabilization apparatus according to the present exemplary embodiment, the first shield plate 319 is arranged to cover the coils 312. Accordingly, in the present exemplary embodiment, as illustrated in FIG. 7B, the amount of magnetic noise (magnetic flux lines) that reaches the image sensor 901 from the coils 312 during image stabilization can be reduced as compared with the case illustrated in FIG. 7A.

More specifically, in a case where a fluctuation in magnetic field (magnetic noise) generated during driving of an image stabilization lens for image stabilization has reached the image sensor 901 which is a solid-state image sensor such as a CMOS sensor, a circuit for reading out a horizontal image signal may be caused to generate a periodically induced electromotive force and horizontal-striped noise may be superimposed on the image capturing signal. However, as described above, the interchangeable lens 100 according to the present exemplary embodiment includes the above-described first shield plate 319, which makes it possible to reduce the amount of magnetic noise that reaches the image sensor 901.

In particular, when the camera body 9 is a mirrorless camera that includes no quick-return mirror, the camera body 9 is smaller than the camera body 9 of a single-lens reflex camera. As a result, the distance between the coils 312 and the image sensor 901 in the optical-axis direction decreases. Accordingly, when the camera body 9 is a mirrorless camera, the effect exerted by the first shield plate 319 is especially important. In addition, recent image sensors have higher sensitivity and the influence of horizontal-striped noise as described above becomes more significant. Therefore, in particular, the effect exerted by the first shield plate 319 is important.

As discussed in Japanese Patent Application Laid-Open No. 2015-169883, if the energization to a voice coil motor (VCM) of an image stabilization apparatus is interrupted during a period in which an electric charge is read out, a holding force for the self-weight of the image stabilization apparatus and the like decreases during the period in which the energization is interrupted. As a result, the optical lens position for image stabilization varies during the period in which the electric charge is read out. Since the optical lens position varies, there is a need to return each optical lens to its original position, which leads to a reduction in the speed of continuous shooting. However, the interchangeable lens 1 according to the present exemplary embodiment includes the above-described first shield plate 319, and thus the interchangeable lens 1 is capable of reducing the amount of magnetic noise that reaches the image sensor 901. Therefore, in the present exemplary embodiment, there is no need to perform control to interrupt the energization to the VCM of the image stabilization apparatus during the period in which the electric charge is read out as discussed in Japanese Patent Application Laid-Open No. 2015-169883.

(More Configurations)

As described above, in the interchangeable lens 100, the first shield plate 319 covers the coils 312. With this configuration, the magnetic field that reaches the image sensor 901 can be reduced. Consequently, it is possible to suppress the deterioration in the image quality during driving of the image stabilization apparatus.

Next, components that are included in the interchangeable lens 100, or components that may be included in the interchangeable lens 100 so that the above-described advantageous effect can be enhanced or advantageous effects other than the above-described advantageous effect can be obtained will be described.

As described above, in the interchangeable lens 100, the drive magnets are provided on both an object side and an image capturing plane side of the coils 312 in such a manner that the drive magnets face the coils 312. Since the drive magnets are opposed to each other at the both sides of the coils 312, the amount of current that flows through the coils 312 during image stabilization can be reduced. As a result, the strength of the magnetic field generated from the coils 312 can be further reduced. With this configuration, the deterioration in the image quality caused during driving of the image stabilization apparatus can be further suppressed.

In the interchangeable lens 100, the coils 312 are fixed to the 3B-group lens barrel 311 so that the drive magnets are arranged at the object side (object plane side) and the image capturing plane side (image plane side) of the coils 312. A location where the first shield plate 319 is provided in the interchangeable lens 100 having the configuration as described above will now be described. Since the 3B-group lens barrel 311 is moved in the direction crossing the optical axis, the first shield plate 319 cannot be provided between the first drive magnets 302 and the coils 312 and between the second drive magnets 315 and the coils 312. Further, since the first drive magnets 302 are magnetically attracted to the first yoke 301, the first shield plate 319 cannot be provided between the first drive magnets 302 and the first yoke 301. For the same reason, the first shield plate 319 cannot be provided between the second drive magnets 315 and the second yoke 317.

As described above with reference to FIGS. 7A and 7B, in view of fluctuation in the magnetic field (magnetic flux density) at the position of the image sensor 901, there is a need for the first shield plate 319 to cover both the image plane side and the side-surface side of the coils 312. Accordingly, the first shield plate 319 is arranged closer to the image plane than the second yoke 317 in the interchangeable lens 100, and is configured to cover, not only the image plane side and the side-surface side of the coils 312, but also the second yoke 317 and the second drive magnets 315.

The positions of the second yoke 317 and the second drive magnets 315, which are covered by the first shield plate 319, are fixed in the optical-axis direction and in the direction crossing the optical axis. As an example case, a case where the first shield plate 319 moves in the direction crossing the optical axis together with the 3B-group lens barrel 311 during image stabilization is considered. In this case, it is necessary to increase the width of the first shield plate 319 in the direction crossing the optical axis to prevent the second yoke 317 and the second drive magnets 315 from contacting the inner surface of the first shield plate 319, and thus this configuration is undesirable. Therefore, in the interchangeable lens 100, the first shield plate 319 is fixed to prevent the first shield plate 319 from being driven during image stabilization. In other words, the position of the first shield plate 319 in the optical-axis direction and in the direction crossing the optical axis is fixed.

Since the first shield plate 319 is configured to cover the side surface of the coils 312, a larger space needs to be formed between the 3B-group lens barrel 311 and the coils 312 as compared with a case where the first shield plate 319 is not provided. If the space between the 3B-group lens barrel 311 and the coils 312 is simply increased, the size of the image stabilization apparatus in a radial direction (direction perpendicular to the optical axis) increases.

Accordingly, in the interchangeable lens 100, a plurality of positive lenses is arranged at the image plane side of each image stabilization lens (11th lens L11 and 12th lens L12). It can also be said that positive lenses each having a predetermined refractive power are arranged at the image plane side of the image stabilization lens as represented by Conditional Expression (1) described below. By providing such positive lenses, an off-axis beam emitted from the image stabilization lens is converged and focused on an image plane, so that the height of the off-axis beam emitted from the image stabilization lens is reduced and the outer diameter of the image stabilization lens is reduced. As a result, the outer diameter of the image stabilization lens is reduced by the amount corresponding to an increase in the space between the 3B-group lens barrel 311 and the coils 312. Therefore, the size of the entire image stabilization apparatus in the radial direction is not increased.

An optical path in a direction opposite to a light travelling direction in the imaging optical system will now be described. In this case, a plurality of positive lenses is arranged closer to the image plane than the image stabilization lens in the imaging optical system, or positive lenses each having a refractive power that satisfies Conditional Expression (1) to be described below are provided. With this configuration, the diameter of a light beam to be incident on the image stabilization lens can be reduced. Accordingly, the size of the image stabilization lens in the radial direction can be reduced.

A plurality of positive lenses, or positive lenses each having a refractive power that satisfies Conditional Expression (1) to be described below, may be provided at the object side of the image stabilization lens.

Further, in the interchangeable lens 100, as illustrated in FIGS. 2 and 3, the focus driving mechanism 34 and the 3B-group lens barrel unit 31 overlap each other in the optical-axis direction. More specifically, at least a part of the focus driving mechanism 34 overlaps at least a part of the 3B-group lens barrel unit 31 as viewed in the direction crossing the optical axis. In the interchangeable lens 100, the configuration at the wide-angle end and the configuration at the telephoto end have the layout relationship as described above. Therefore, in the interchangeable lens 100, the first drive magnets 302, the second drive magnets 315, and the coils 312 are arranged at positions facing the focus driving mechanism 34 with respect to the optical axis. With this arrangement, a further reduction in the size of the interchangeable lens 100 in the radial direction can be achieved.

Second Exemplary Embodiment

Next, a configuration of a 3B-group lens barrel unit 35 which is an image stabilization apparatus according to a second exemplary embodiment will be described with reference to FIG. 8. The interchangeable lens 100 according to the first exemplary embodiment described above and the lens apparatus according to a second exemplary embodiment differ with regard to the configuration of the image stabilization apparatus. The lens apparatus according to the present exemplary embodiment is one type of the interchangeable lens 1 described above.

Figure 8:
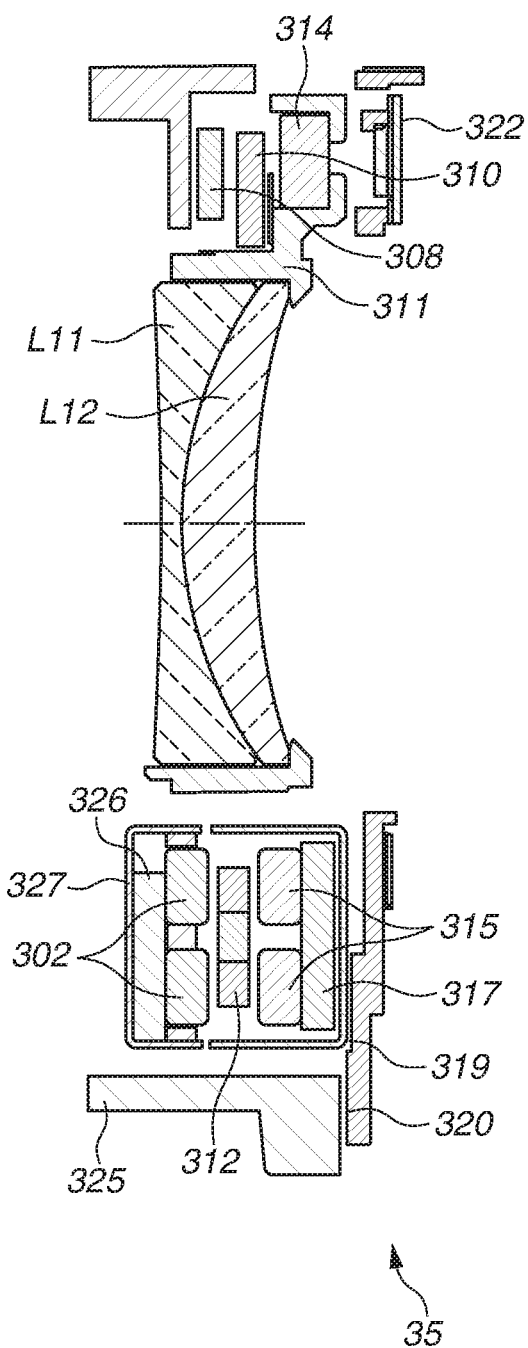
FIG. 8 is a sectional view illustrating an image stabilization apparatus according to a second exemplary embodiment.

FIG. 8 is a sectional view of the 3B-group lens barrel unit 35 which is the image stabilization apparatus according to the present exemplary embodiment. As illustrated in FIG. 8, in the present exemplary embodiment, a second shield plate (second shield member) 327 is newly provided in the image stabilization apparatus, in addition to the first shield plate 319 according to the first exemplary embodiment described above. The configuration and role of a ground plate 325 are similar to those of the ground plate 303 described in the first exemplary embodiment, while the shape of the ground plate 325 is slightly different from the shape of the ground plate 303. The configuration and role of a first yoke 326 are similar to those of the first yoke 301 described in the first exemplary embodiment, while the shape of the first yoke 326 is slightly different from the shape of the first yoke 301.

The second shield plate 327 is fixed by adhesion to the first yoke 326 with a double-sided adhesive tape (not illustrated). Like the first shield plate 319 described above, the second shield plate 327 is made of a material which is non-magnetic and has a small electric resistance, such as copper or aluminum. Further, the second shield plate 327 is arranged to cover the coils 312 from the object side. However, since the side surfaces of the coils 312 are covered by the first shield plate 319, the second shield plate 327 does not cover the side surfaces of the coils 312. In other words, the second shield plate 327 covers at least a part of the coils 312 as viewed in the direction parallel to the optical axis. The second shield plate 327 does not cover at least a part of the coils 312 as viewed in the direction crossing the optical axis. At least a part of the second shield plate 327 is arranged closer to the object than the coils 312 in the imaging optical system.

Since the second shield plate 327 has the above-described shape, the size of the 3B-group lens barrel unit 35 in the radial direction can be reduced as compared with a case where two shield plates overlap each other. However, a configuration in which two shield plates overlap each other may be employed. That is, the second shield plate 327 may cover at least a part of each of the coils 312 as viewed in the direction crossing the optical axis.

In the image stabilization apparatus according to the present exemplary embodiment, the first shield plate 319 and the second shield plate 327 cover the coils 312 from the object side and the image capturing plane side. With this configuration, the magnetic flux lines (magnetic noise) that reach the image sensor 901 can be further reduced, as compared with the first exemplary embodiment.

Third Exemplary Embodiment

Next, a configuration of an interchangeable lens 200 which is a lens apparatus according to a third exemplary embodiment will be described with reference to FIGS. 9 to 13. The interchangeable lens 200 according to the present exemplary embodiment is one type of the interchangeable lens 1 described above.

(Configuration of Interchangeable Lens 200)

Figure 9:
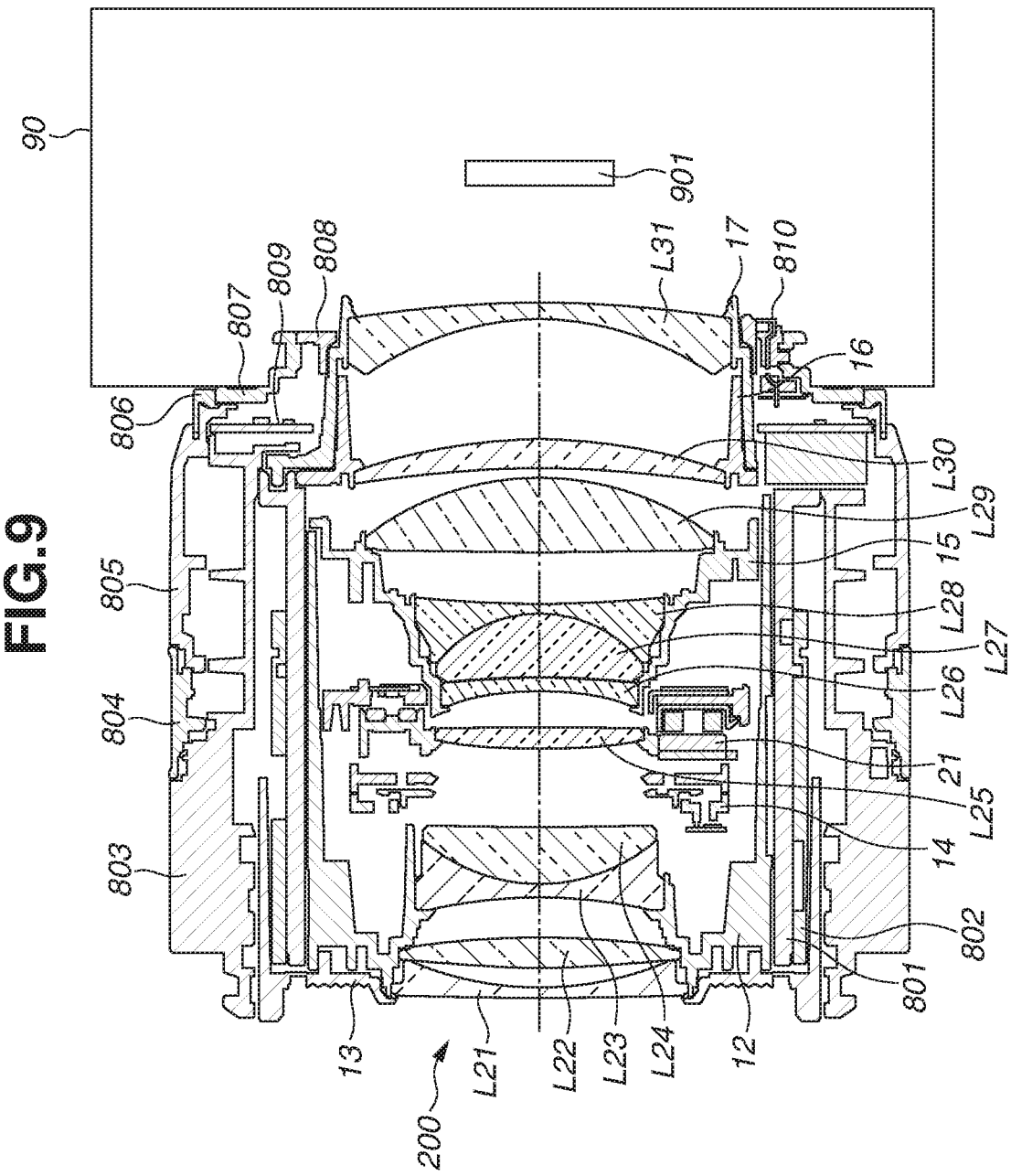
FIG. 9 is a sectional view illustrating a lens apparatus in an in-focus state on an object at infinity according to a third exemplary embodiment.
Figure 10:
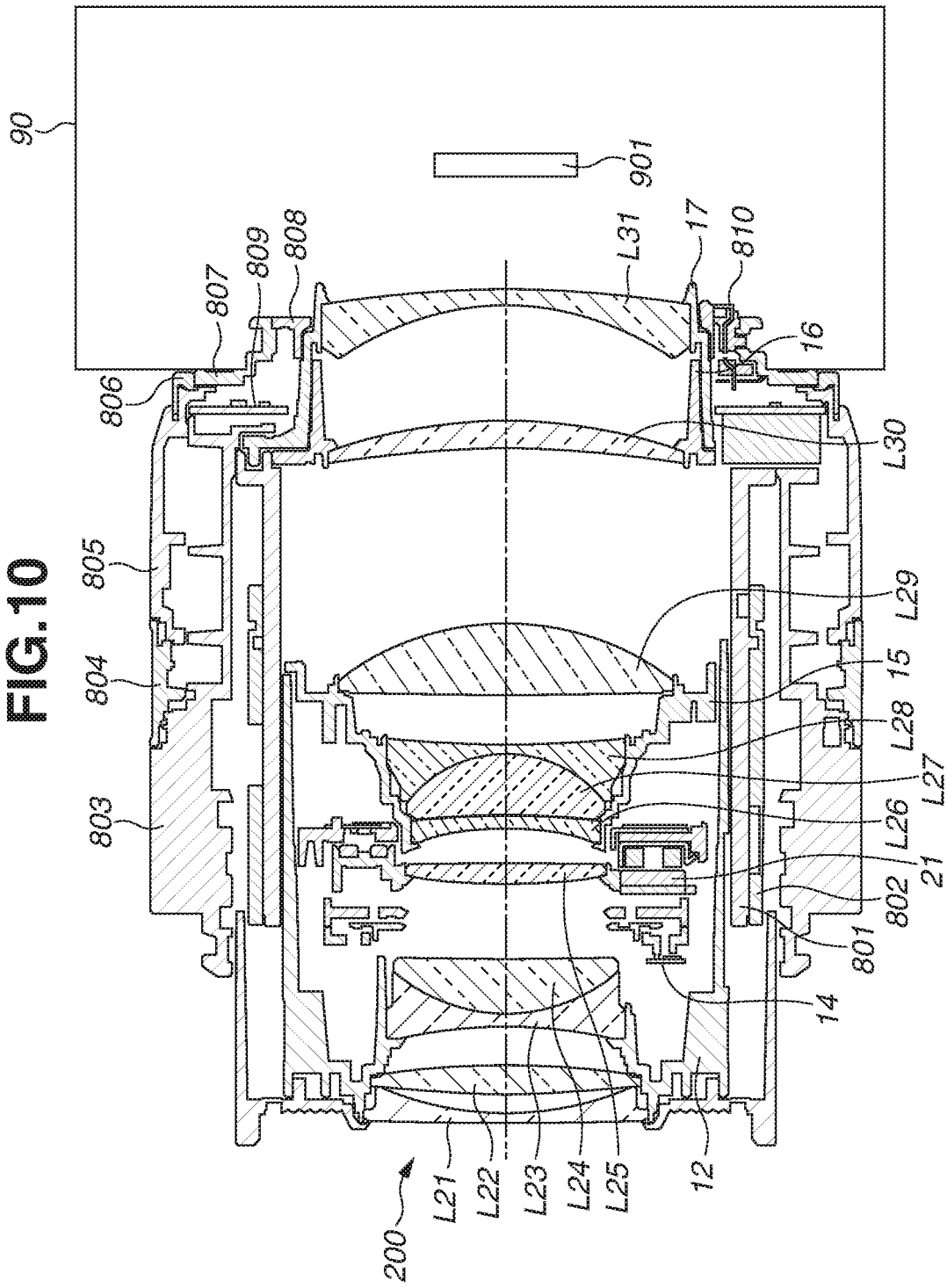
FIG. 10 is a sectional view illustrating the lens apparatus in an in-focus state on an object at a close distance according to the third exemplary embodiment.

FIG. 9 is a sectional view of the interchangeable lens 200 in an in-focus state on an object at infinity. FIG. 10 is a sectional view of the interchangeable lens 200 in an in-focus state on an object at a close distance.

A 1A-group lens barrel 12 holds a first lens L21, a second lens L22, a third lens L23, and a fourth lens L24. A front cover 13 is fixed to the 1A-group lens barrel 12. A 1B-group lens barrel unit 21 is an image stabilization apparatus that holds a fifth lens L25 and moves the fifth lens L25 within the plane perpendicular to the optical axis to correct a so-called image burring due to hand shake.

An aperture unit 14 adjusts the amount of light, and is fixed to the 1B-group lens barrel unit 21. A 1C-group lens barrel 15 holds a sixth lens L26, a seventh lens L27, an eighth lens L28, and a ninth lens L29. A 2A-group lens barrel 16 holds a tenth lens L30. A 2B-group lens barrel 17 holds a 11th lens L31. The 1B-group lens barrel unit 21 and the 1C-group lens barrel 15 are fixed to the 1A-group lens barrel 12. The 2A-group lens barrel 16 is fixed to the 2B-group lens barrel 17.

A guide barrel 801 has straight grooves each extending in the optical-axis direction. A cam ring 802 that is rotatable relatively to the guide barrel 801 is fit to the outer periphery of the guide barrel 801. The 2B-group lens barrel 17 is fixed to the guide barrel 801. A fixing barrel 803 fixes the guide barrel 801. On a printed circuit board 809, an IC for driving the interchangeable lens 200, a microcomputer, an angular velocity sensor, and the like are arranged. The printed circuit board 809 is fixed to the fixing barrel 803. The image stabilization is performed by the 1B-group lens barrel unit 21 based on the angular velocity detected by the angular velocity sensor included in the printed circuit board 809.

An MF ring 804 is held between the fixing barrel 803 and an exterior barrel 805, and is supported to be rotatable around the fixing barrel 803. When the MF ring 804 is rotated, the rotation is detected by a sensor (not illustrated) and a focus control operation is performed based on the amount of rotation. A mount ring 806 is fixed to the fixing barrel 803. A mount 807 is fixed to the fixing barrel 803. A back lid 808 is fixed to the mount 807. A contact block 810 is electrically connected to the printed circuit board 809 with a wire (a flexible printed circuit board or the like) (not illustrated) and is fixed to the mount 807.

The interchangeable lens 200 is fixed by bayonet connection to a camera body 90 with the mount 807. When the interchangeable lens 200 is fixed to the camera body 90, the printed circuit board 809 that controls the operation of each lens can communicate with the camera body 90 via the contact block 810.

(Configuration for Driving Focus Lens Unit)

A configuration for driving the focus lens unit will be described. As described above, the 1B-group lens barrel unit 21 to which the aperture unit 14 is fixed and the 1C-group lens barrel 15 are fixed to the 1A-group lens barrel 12. A roller (not illustrated) provided on the 1A-group lens barrel 12 engages with each of cam grooves in the cam ring 802 and straight grooves in the guide barrel 801. Accordingly, the 1A-group lens barrel 12 moves in the optical-axis direction along with the rotation about the optical axis of the cam ring 802. The cam ring 802 is rotated by a focus driving mechanism (not illustrated).

Specifically, a focusing operation is perform by rotation of the cam ring 802 which is rotated by the focus driving mechanism to move the 1A-group lens barrel 12, the aperture unit 14, the 1B-group lens barrel unit 21, and the 1C-group lens barrel 15 in an integrated manner in the optical-axis direction. In this case, a set of a plurality of lenses that move in the optical-axis direction during the focusing operation is referred to as a focus lens unit in the present exemplary embodiment. An imaging optical system included in the interchangeable lens 200 includes a first lens group (first lens unit) having a positive refractive power, and a second lens group (second lens unit) having a negative refractive power. The first lens group and the second lens group are arranged in order from the object side to the image plane side. The first lens unit described herein refers to a set of a plurality of lenses that move in the optical-axis direction during the focusing operation. The second lens unit described herein refers to a set of a plurality of lenses that do not move in the optical-axis direction during the focusing operation. In other words, the boundary between the first lens unit and the second lens unit is within the interval between the lenses that varies during the focusing operation.

(Configuration of Image Stabilization Apparatus)

Figure 11:
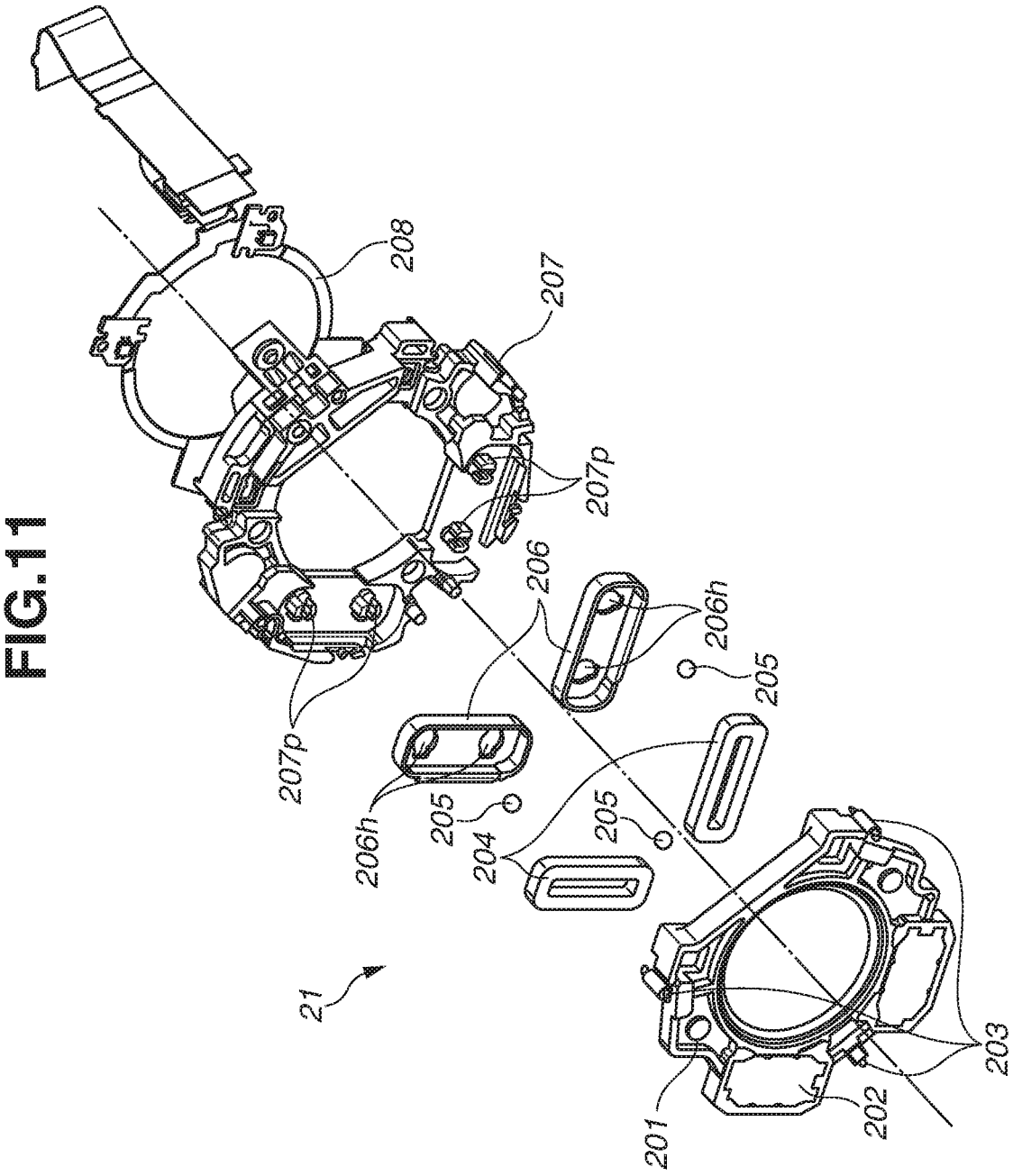
FIG. 11 is an exploded perspective view illustrating an image stabilization apparatus according to the third exemplary embodiment.
Figure 12:
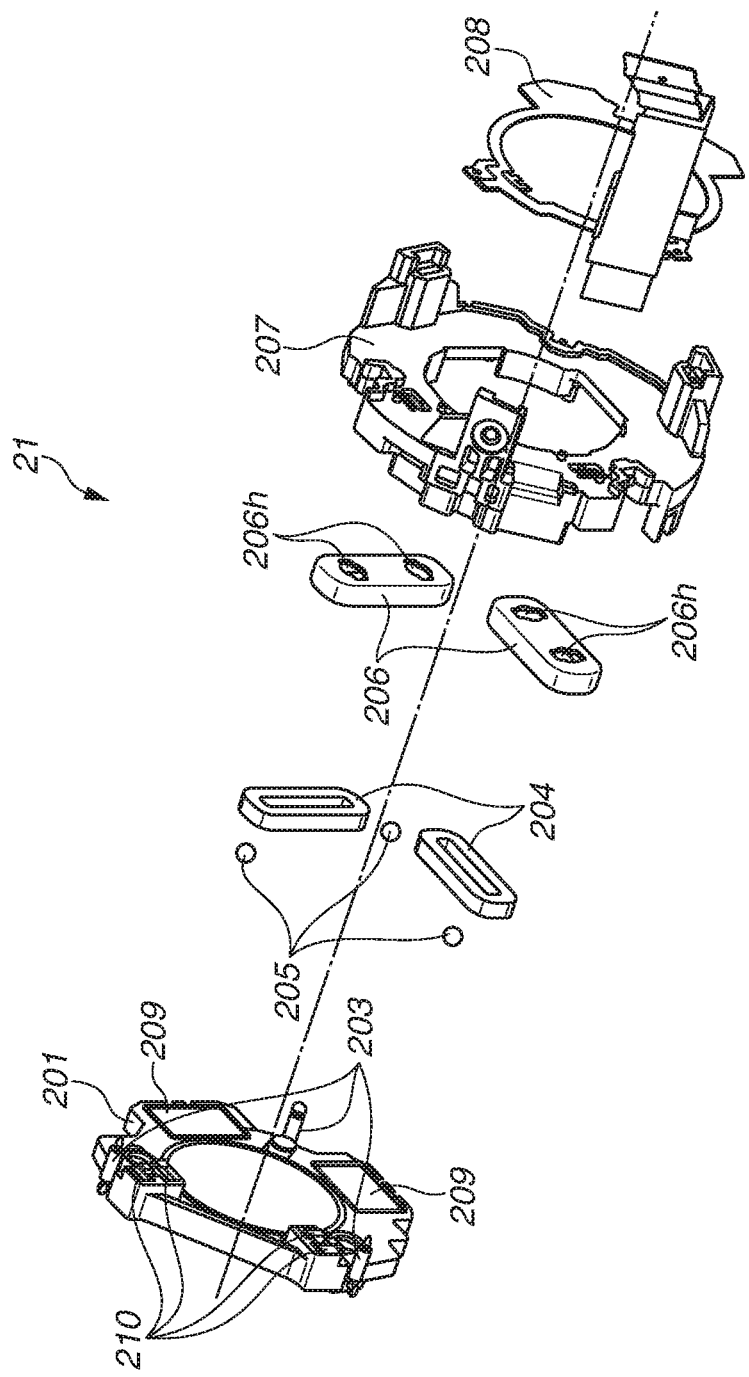
FIG. 12 is an exploded perspective view illustrating the image stabilization apparatus according to the third exemplary embodiment.
Figure 13:
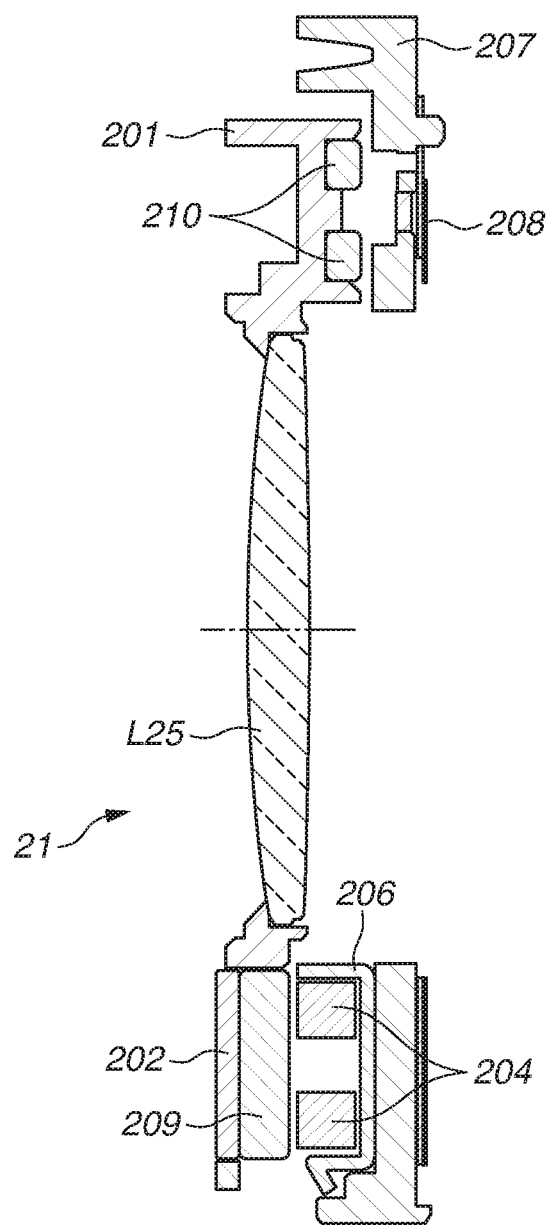
FIG. 13 is a sectional view illustrating the image stabilization apparatus according to the third exemplary embodiment.

Next, the configuration of the 1B-group lens barrel unit 21 which is the image stabilization apparatus according to the present exemplary embodiment will be described with reference to FIGS. 11, 12, and 13. FIGS. 11 and 12 are exploded perspective views of the 1B-group lens barrel unit 21. FIG. 13 is a sectional view of the 1B-group lens barrel unit 21.

A 1B-group lens barrel (movable member) 201 holds the fifth lens L25. By moving the fifth lens L25 within the plane perpendicular to the optical axis, a so-called image blurring due to hand shake can be corrected. A yoke 202 and drive magnets 209 are each fixed to the 1B-group lens barrel 201 by magnetic attraction forces of the yoke 202 and the drive magnets 209 in such a manner that the yoke 202 and the drive magnets 209 hold the 1B-group lens barrel 201. The drive magnets 209 may be provided or held on the 1B-group lens barrel 201.

Position detection magnets 210 are fixed by adhesion to the 1B-group lens barrel 201. The 1B-group lens barrel 201 is supported on a ground plate 207 by balls 205 to be movable within the plane perpendicular to the optical axis. The 1B-group lens barrel 201 is constantly pulled toward the ground plate 207 by tensile springs 203.

A flexible substrate 208 includes a hall sensor, and is fixed by adhesion to the ground plate (fixed member) 207. The flexible substrate 208 is electrically connected to the printed circuit board 809. The hall sensor included in the flexible substrate 208 is arranged at a position facing the position detection magnets 210. The movement of the ground plate 207 within the plane perpendicular to the optical axis is restricted.

Shield plates 206 are fixed by adhesion to the ground plate 207. Each shield plate 206 is made of a material which is non-magnetic and has a small electric resistance (high conductivity), such as copper or aluminum. Coils 204 are fixed by adhesion to the ground plate 207. In other words, the coils 204 is provided on the ground plate 207.

The flexible substrate 208 is electrically connected to the coils 204 by soldering. A current flows through the coils 204 to generate the Lorentz force at the drive magnets 209. The generated Lorentz force moves the 1B-group lens barrel 201 within the plane perpendicular to the optical axis (in the direction crossing the optical axis). The coils 204 and the drive magnets 209 are each provided in such a manner that one of the members is arranged in a direction perpendicular to a direction in which the other one of the member is arranged. Accordingly, the 1B-group lens barrel 201 can freely move within a predetermined range within the plane perpendicular to the optical axis by a combined force of drive forces in the two directions.

The hall sensor included in the flexible substrate 208 converts the magnetic flux density of each of the position detection magnets 210 into an electric signal. When the 1B-group lens barrel 201 is driven, a variation in the magnetic flux density from each of the position detection magnets 210 is detected by the hall sensor, and the electric signal corresponding to the variation in the magnetic flux density is output. The position of the 1B-group lens barrel 201 can be detected based on the electric signal.

(Configuration of Magnetic Shield)

Next, the shield plates 206 each serving as a magnetic shield according to the present exemplary embodiment will be described in detail with reference to FIG. 13. FIG. 13 is a sectional view of the 1B-group lens barrel unit 21.

The 1B-group lens barrel unit 21 includes the shield plate 206 that operates as a magnetic shield. The shield plate 206 is arranged to cover the coils 204 as illustrated in FIG. 13. More specifically, the surfaces of the coils 204 on the side of the image sensor 901 as viewed in the optical-axis direction are covered by the shield plate 206, and the surfaces of the coils 204 in the thickness direction in which the coils 204 are wound are also covered. In other words, as illustrated in FIG. 13, the shield plate 206 covers at least a part of the coils 204 as viewed in the direction parallel to the optical axis and as viewed in the direction crossing the optical axis. At least a part of the shield plate 206 is arranged closer to the image plane than the coils 204 in the imaging optical system.

Like in the first and second exemplary embodiments described above, also in the present exemplary embodiment, since the coils are covered by the shield plates, the magnetic flux lines (magnetic noise) that reach the image sensor 901 can be reduced. Consequently, it is possible to suppress the deterioration in the image quality caused during driving of the image stabilization apparatus.

Unlike in the first and second exemplary embodiments described above, in the present exemplary embodiment, the coils are provided on the ground plate and the magnets are provided on a movable lens barrel. This configuration eliminates the need for providing a flexible substrate or the like on the 1B-group lens barrel 201. Therefore, it is possible to prevent a reactive force or the like from being generated from the flexible substrate during image stabilization driving. Accordingly, the 1B-group lens barrel 201 can be driven with a driving force smaller than that in the first and second exemplary embodiments described above, and the amount of current flowing through the coils 204 can be reduced. As a result, the magnetic field generated from the coils 204 can be reduced.

The first to third exemplary embodiments can be summarized as follows. That is, the lens apparatus according to the first to third exemplary embodiments includes a coil that is provided at one of a movable member and a fixed member to move the movable member in the direction crossing the optical axis. The lens apparatus also includes a magnet that is provided at the other one of the movable member and the fixed member to move the movable member in the direction crossing the optical axis.

In the present exemplary embodiment, the drive magnets 209 are arranged only on a side of one surface of the coils 204. With this configuration, the thickness of the image stabilization apparatus in the optical-axis direction can be reduced.

Like in the first and second exemplary embodiments described above, also in the present exemplary embodiment, a plurality of positive lenses is arranged at the image plane side of the image stabilization lens (fifth lens L25). It can also be said that positive lenses each having a predetermined refractive power are arranged at the image plane side of the image stabilization lens as represented by Conditional Expression (1) described below. The advantageous effect by the positive lenses provided as described above has been described above.

In the present exemplary embodiment, as illustrated in FIGS. 11 and 12, each of the shield plates 206 has openings 206h. When the shield plates 206 are fixed on the ground plate 207, each protruding portions 207P on the ground plate 207 is inserted (fit) into a different one of the openings 206h in the shield plates 206. This configuration facilitates positioning of the shield plates 206 with respect to the ground plate 207 at desired positions.

Since each of the shield plates 206 has the openings 206h, it is difficult to cover the entire coils 204 using the shield plates 206 as viewed in the optical-axis direction (as viewed in the direction parallel to the optical axis) from the image plane side in the imaging optical system. However, as described above, the shield plates 206 may cover at least a part of the coils 204, respectively, as viewed in the optical-axis direction and as viewed in the direction crossing the optical axis. This also holds true for the first and second exemplary embodiments described above.
(Description of Configuration of Imaging Optical System)

Next, an optical configuration of an imaging optical system that can be mounted on the interchangeable lenses according to the first to third exemplary embodiments will be described in detail with reference to FIGS. 14 to 19B. Each of the exemplary embodiments described above illustrates an example of an interchangeable lens which is attached to and detached from a single-lens reflex digital camera or a mirrorless digital camera. However, the lens apparatus according to an exemplary embodiment of the present disclosure is not limited to the interchangeable lens, but instead may be a lens apparatus included in an optical apparatus such as a video camera, a silver-halide film camera, a television (TV) camera, or a projector. Therefore, an imaging optical system (image forming optical system) to be described below can also be mounted on each of the optical apparatuses described above.

DESCRIPTION OF DRAWINGS

Figure 14:
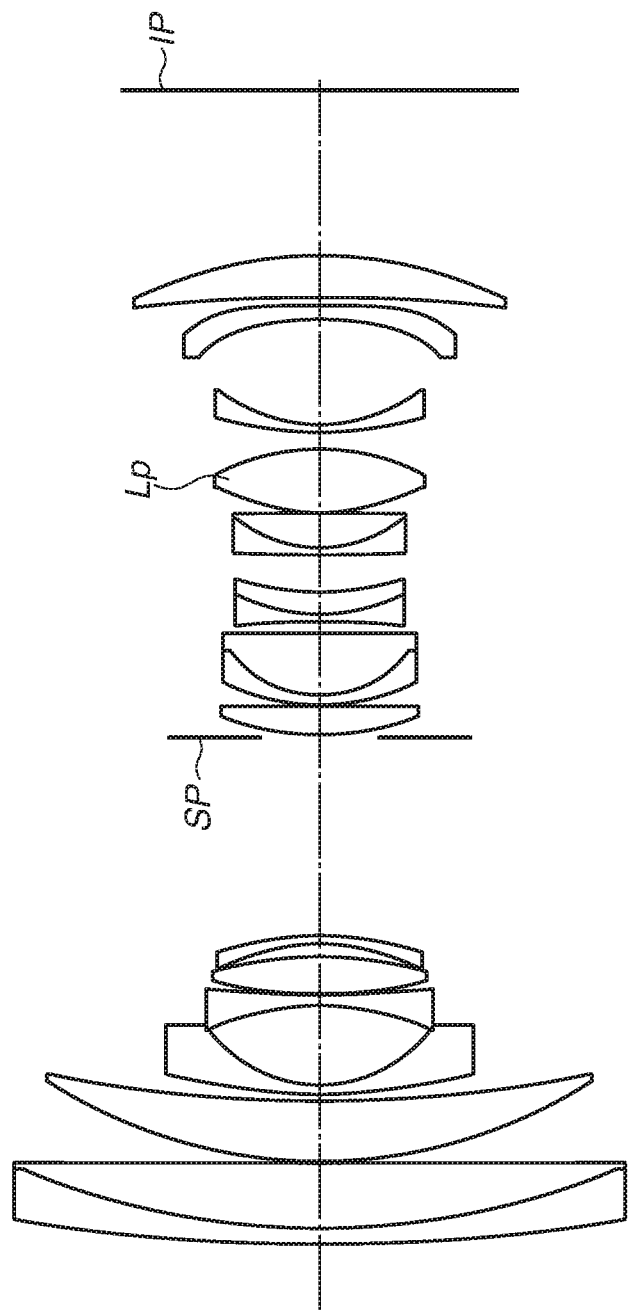
FIG. 14 is a sectional view illustrating lenses of an optical system according to a first numerical example.
Figure 15A:
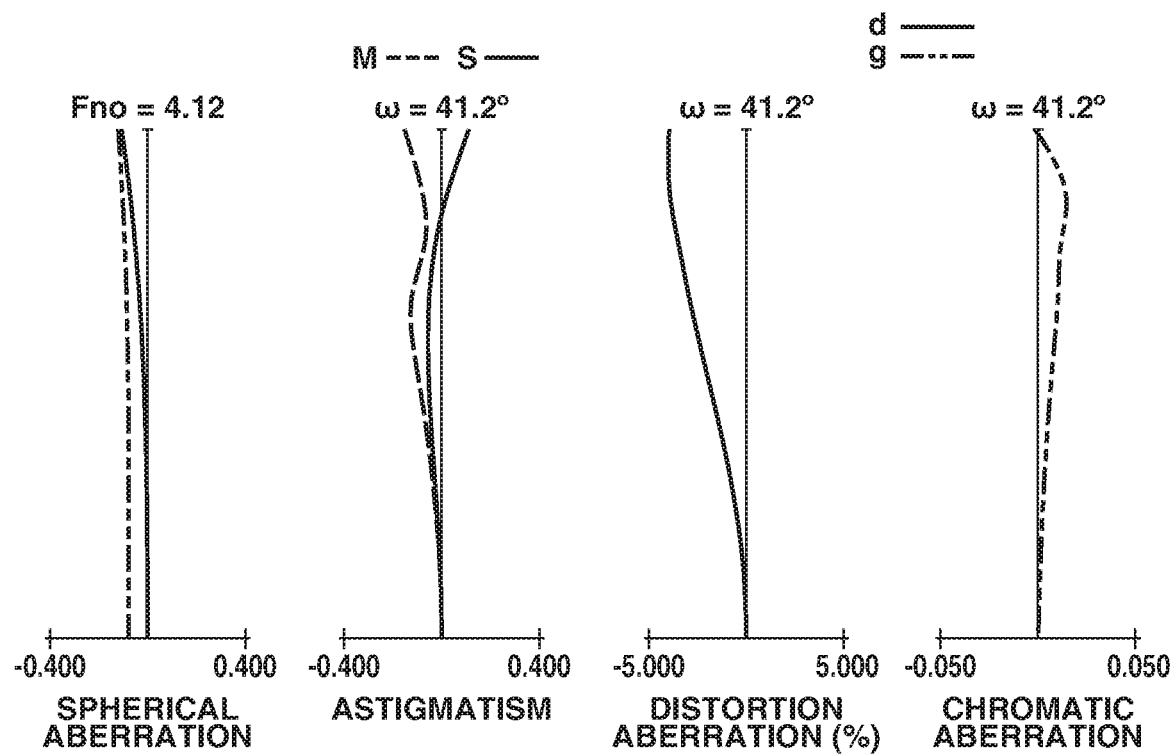
FIGS. 15A and 15B are aberration diagrams at a wide-angle end and at a telephoto end of an imaging optical system in an in-focus state on an object at infinity according to the first numerical example.
Figure 15B:
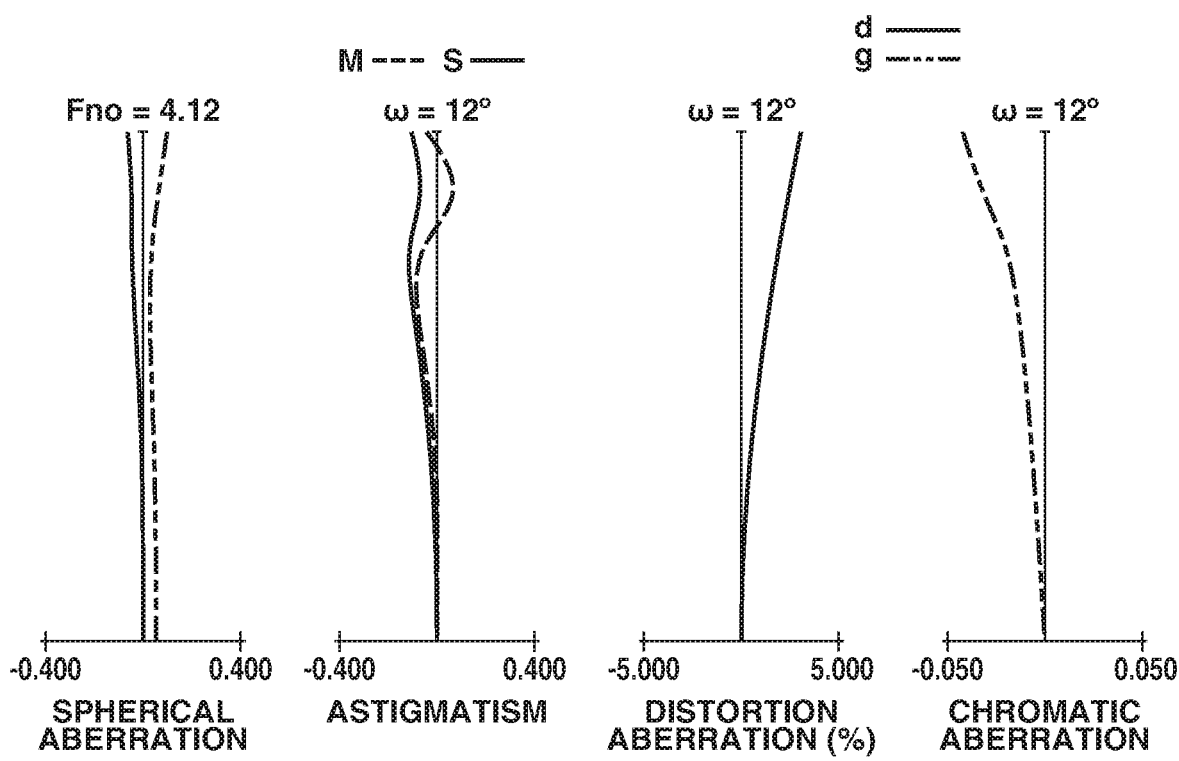
Figure 17A:
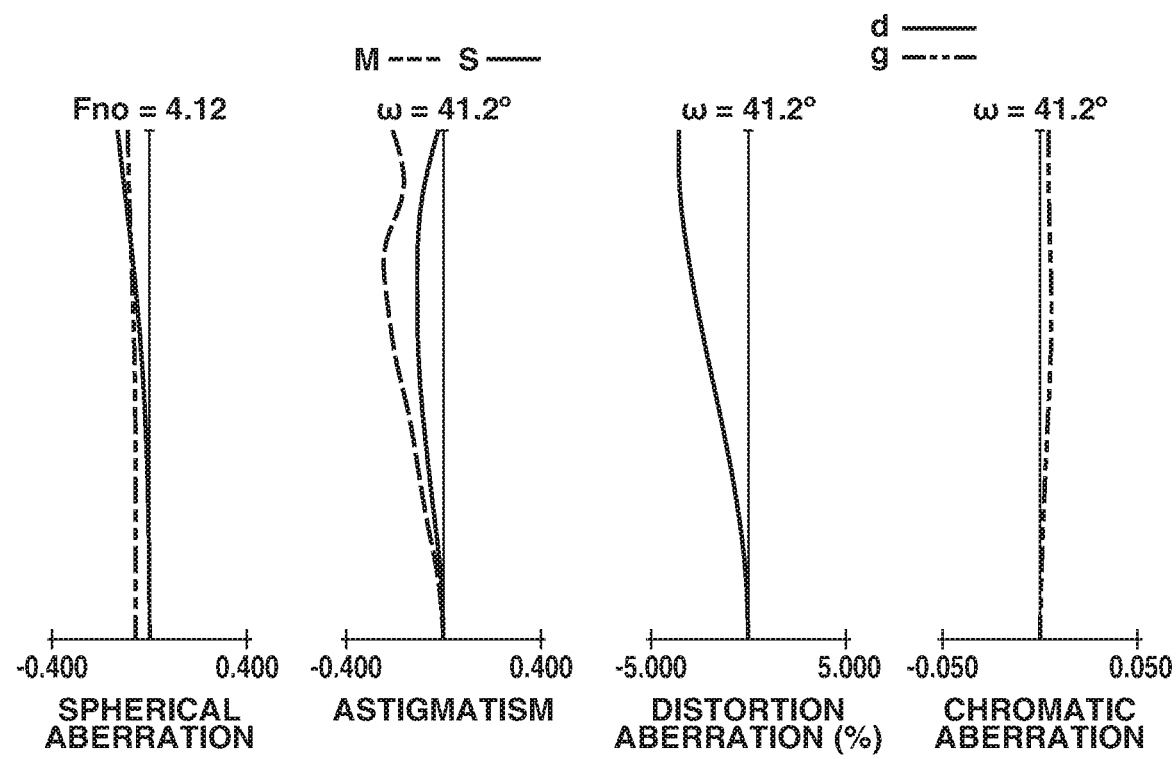
FIGS. 17A and 17B are aberration diagrams at a wide-angle end and at a telephoto end of an imaging optical system in an in-focus state on an object at infinity according to the second numerical example.
Figure 17B:
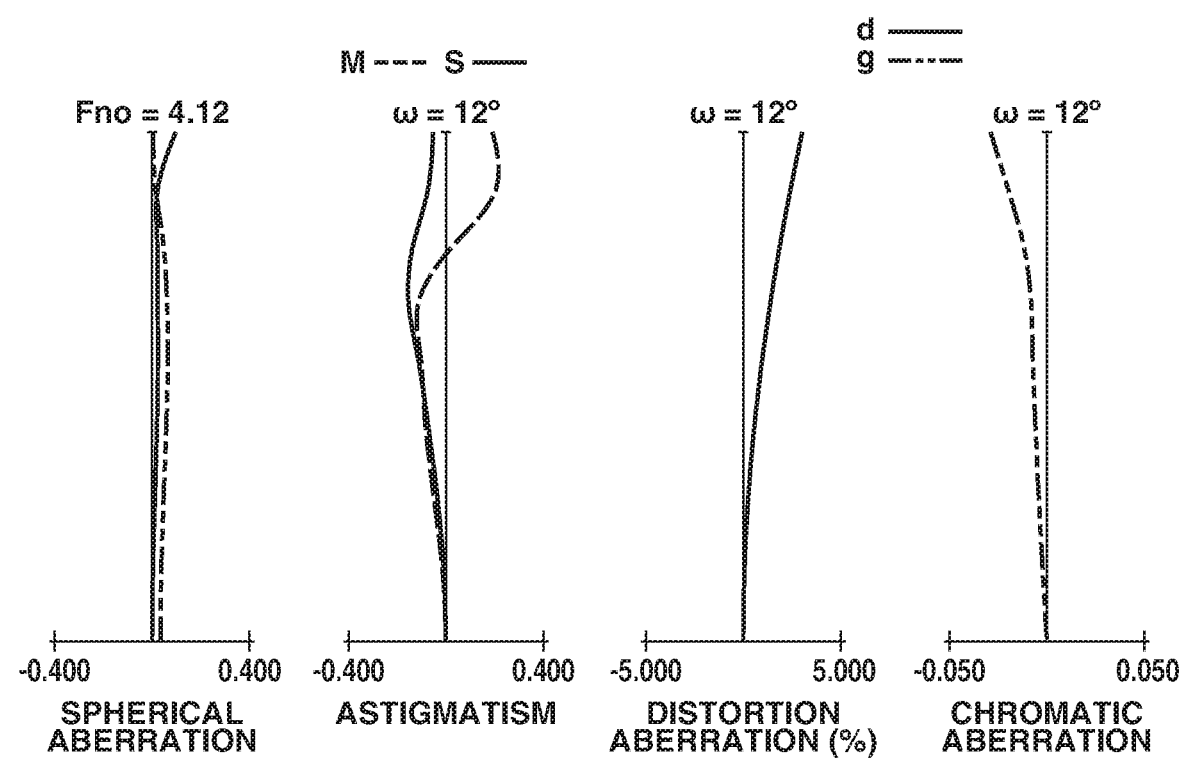
Figure 18:
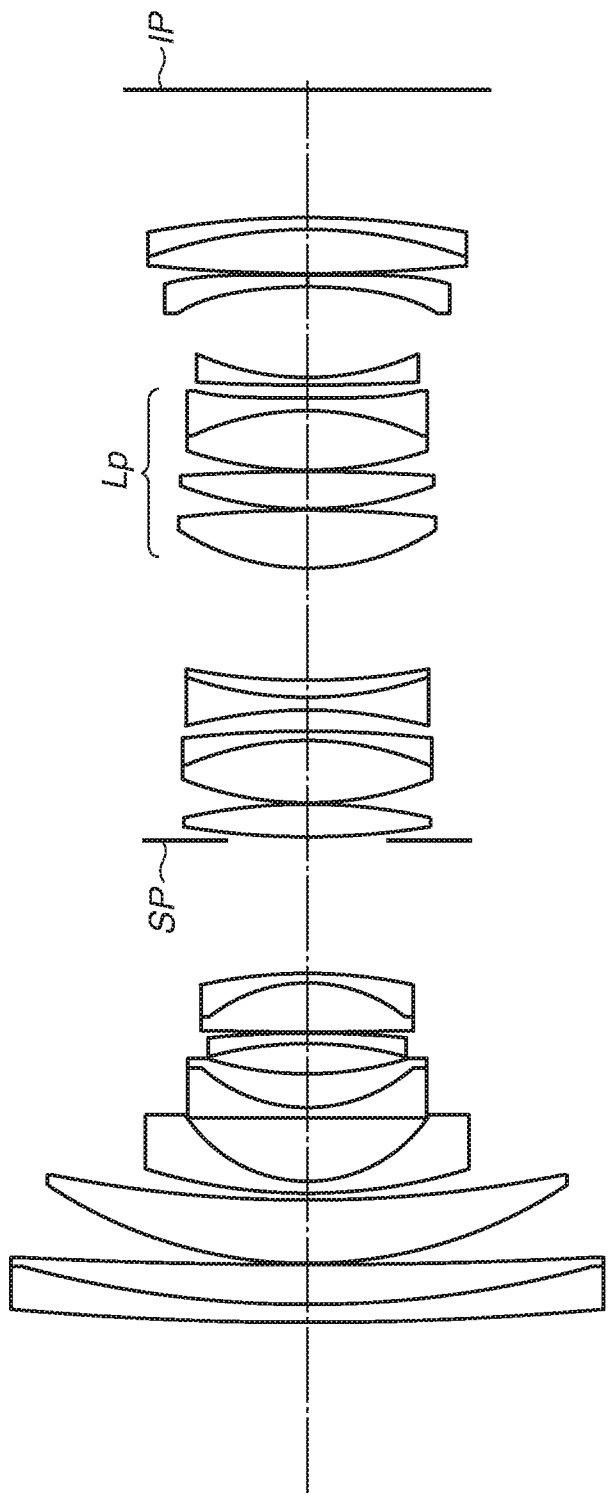
FIG. 18 is a lens sectional view of an optical system according to a third numerical example.
Figure 19A:
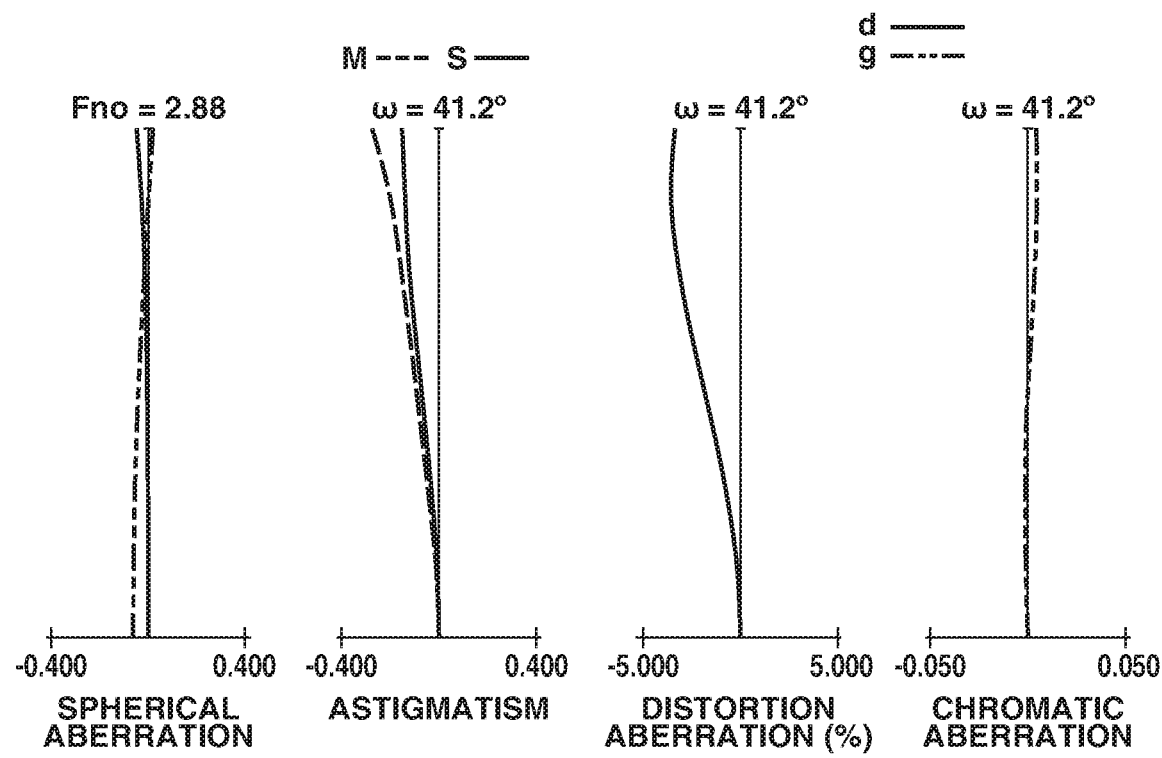
FIGS. 19A and 19B are aberration diagrams at a wide-angle end and at a telephoto end of an imaging optical system in an in-focus state on an object at infinity according to the third numerical example.
Figure 19B:
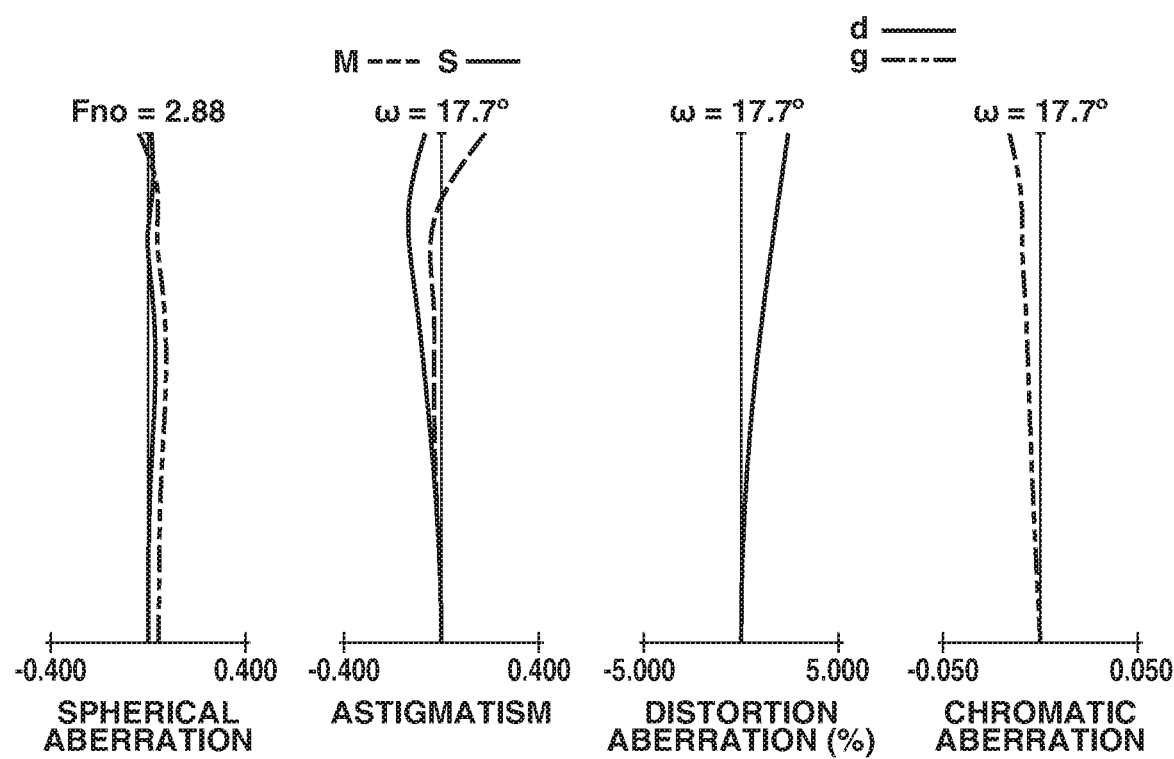

In lens sectional views illustrated in FIGS. 14, 16, and 18 according to numerical examples, the left side of the drawing sheet corresponds to the object side (front side), and the right side of the drawing sheet corresponds to the image plane side (rear side). In a case of a projection optical system for a projector, the left side of the drawing sheet corresponds to the image plane side (screen side) and the right side of the drawing sheet corresponds to the object side (image forming element side). In each lens sectional view, the left side of the drawing sheet may correspond to an enlargement conjugate side and the right side of the drawing sheet may correspond to a reduction conjugate side. Further, in each lens sectional view, SP represents an aperture diaphragm that determines (restricts) a light beam of an open F-number (Fno). IP represents an image plane. When the lens apparatus is used as an imaging optical system for a video camera or a digital still camera, an image capturing plane of a solid-state image sensor (photoelectric conversion element) such as a CCD sensor or a CMOS sensor is disposed at the image plane IP. When the lens apparatus is used as an imaging optical system for a silver-halide film camera, a photosensitive surface corresponding to a film surface is disposed at the image plane IP. In the case of a projection optical system for a projector, the image plane IP corresponds to an illumination surface on a liquid crystal panel, an image forming element, such as a digital mirror array, or a light modulation element.

In aberration diagrams illustrated in FIG. 15, FIGS. 17A and 17B, and FIGS. 19A and 19B, according to the numerical examples, Fno represents an F-number, and w represents the half angle of view (degree), which is an angle of view obtained by paraxial calculation. In spherical aberration diagrams, d represents a d-line (wavelength of 587.56 nm), g represents a g-line (wavelength of 435.835 nm), C represents a C-line (wavelength of 656.27 nm), and F represents an F-line (wavelength of 486.13 nm). In astigmatism diagrams, ΔS represents a sagittal image plane on the d-line, and ΔM represents a meridional image plane on the d-line. A distortion aberration for the d-line is illustrated. In magnification chromatic aberration diagrams, g represents a g-line, C represents a C-line, and F represents an F-line.
(Description of Conditional Expressions)

In the imaging optical system according to each of the numerical examples, at least one of the following conditional expressions may be desirably satisfied.

Definitions of signs used in each conditional expression will be described. A lens group which is arranged closer to the image plane than the image stabilization optical system (image stabilization lens) in the imaging optical system and which is immovable during image stabilization and has a positive refractive power is referred to as a lens group Lp (lens unit Lp). The focal length of the image stabilization optical system is represented by fis, and the focal length of the lens group Lp is represented by fp.

If there is a plurality of lenses that move within the plane perpendicular to the optical axis during image stabilization, the focal length of the whole lenses is represented by fis. If there is only one lens that moves within the plane perpendicular to the optical axis during image stabilization, the focal length of the one lens is represented by fis.

The lens unit Lp has a configuration described below according to the numerical examples. That is, if there is one positive lens which is arranged closer to the image plane than the image stabilization optical system (image stabilization lens) in the imaging optical system, and which is immovable during image stabilization and satisfies Conditional Expression (1), the one positive lens corresponds to the lens group Lp. Alternatively, in a case where there is a plurality of lens which is arranged closer to the image plane than the image stabilization optical system (image stabilization lens) in the imaging optical system, and which is immovable during image stabilization, if the focal length of a plurality of lenses, such as the 11th, 12th, and 13th lenses, which are successively arranged from the image plane, among the plurality of lenses, satisfies Conditional Expression (1), a set of the 11th, 12th, and 13th lenses arranged in order from the image plane corresponds to the lens unit Lp. In this case, if the entire lens unit Lp has a positive refractive power, any one of the 11th, 12th, and 13th lenses may be a negative lens.

According to the numerical examples, the focal length of the entire imaging optical system during focusing at infinity at the wide-angle end is represented by fw, the back-focus at the wide-angle end is represented by skw, and the focal length of the first lens group is represented by f1. The first lens group described herein refers to a lens group which is provided at the place closest to the object (the most enlargement conjugate position) among a plurality of lens units included in the imaging optical system according to each numerical embodiment. The boundary between the lens units is within the interval between lenses that varies during zooming. The imaging optical system according to each numerical embodiment is a zoom lens including a plurality of lens units configured in such a manner that the interval between adjacent lens units varies during zooming.

The total optical length of the entire imaging optical system during focusing at infinity at the wide-angle end is represented by DL, and the distance on the optical axis from the aperture diaphragm to a farthest lens surface in the image stabilization optical system is represented by Dis.

In this case, the imaging optical system according to each numerical embodiment satisfies at least one of the following conditional expressions.

$$0.8 \leq |fis/fp| \leq 8.0 \quad (1)$$

$$0.5 \leq |fw/skw| \leq 5.0 \quad (2)$$

$$1.0 \leq |f1/fw| \leq 9.0 \quad (3)$$

$$0.01 \leq |Dis/DL| \leq 0.30 \quad (4)$$

$$0.5 \leq |fis/fw| \leq 5.0 \quad (5)$$

Technical meanings of Conditional Expressions (1) to (5) will be described below.

In Conditional Expression (1), the ratio between the refractive power of the image stabilization optical system and the refractive power of the lens group Lp is optimized. If the upper limit of Conditional Expression (1) is exceeded, the refractive power of the image stabilization optical system decreases and the image stabilization optical system needs to be moved to a large extent in the vertical direction during image stabilization, so that the size of the image stabilization apparatus increases, which is undesirable. If the lower limit of Conditional Expression (1) is exceeded, the refractive power of the image stabilization optical system increases and a variation in aberration increases when the image stabilization optical system is moved in the vertical direction during image stabilization, which is undesirable.

By appropriately setting the refractive power of the lens group Lp to satisfy Conditional Expression (1), the size of the image stabilization optical system in the radial direction can be reduced. Accordingly, when Conditional Expression (1) is satisfied, an increase in the size of the image stabilization apparatus in the radial direction can be suppressed even if a space is formed between the movable lens barrel for a magnetic shield and the coils as described above.

In Conditional Expression (2), the back-focus of the imaging optical system is optimized. If the upper limit of Conditional Expression (2) is exceeded, the back-focus of the imaging optical system becomes shorter and the outer diameter of the last lens increases, which is undesirable. If the lower limit of Conditional Expression (2) is exceeded, the back-focus of the imaging optical system becomes longer and the total optical length of the imaging optical system increases, which is undesirable.

When the imaging optical system that satisfies Conditional Expression (2) is an imaging optical system for a mirrorless digital camera, the coil and the image sensor approach each other as described above. Accordingly, in the lens apparatus having the imaging optical system that satisfies Conditional Expression (2), the above-described magnetic shields operate effectively.

In Conditional Expression (3), the refractive power of the first lens unit is optimized. If the upper limit of Conditional Expression (3) is exceeded, the refractive power of the first lens unit decreases and the total optical length of the imaging optical system increases, which is undesirable. If the lower limit of Conditional Expression (3) is exceeded, the refractive power of the first lens unit increases and various aberrations such as a spherical aberration occur, which is undesirable.

In Conditional Expression (4), the distance from the aperture diaphragm to the image stabilization optical system is optimized. If the upper limit of Conditional Expression (4) is exceeded, the distance from the aperture diaphragm to the image stabilization optical system increases and the lens outer diameter of the image stabilization optical system increases, which is undesirable. If the lower limit of Conditional Expression (4) is exceeded, the aperture diaphragm and the image stabilization optical system are more likely to interfere with each other, which is undesirable.

By appropriately setting the position of the image stabilization optical system to satisfy Conditional Expression (4), the size of the image stabilization optical system in the radial direction can be reduced. Accordingly, when Conditional Expression (4) is satisfied, an increase in the size of the image stabilization apparatus in the radial direction can be suppressed even if a space is formed between the movable lens barrel for the magnetic shield and the coils as described above.

In Conditional Expression (5), the focal length of the image stabilization optical system is optimized. If the upper limit of Conditional Expression (5) is exceeded, the refractive power of the image stabilization optical system decreases and the image stabilization optical system needs to be moved to a large extent in the vertical direction during image stabilization, so that the size of the image stabilization apparatus increases, which is undesirable. If the lower limit of Conditional Expression (5) is exceeded, the refractive power of the image stabilization optical system increases and a variation in aberration increases when the image stabilization optical system is moved in the vertical direction during image stabilization, which is undesirable.

By appropriately setting the refractive power for the image blurring to satisfy Conditional Expression (5), the size of the image stabilization optical system in the radial direction can be reduced. Accordingly, when Conditional Expression (5) is satisfied, an increase in the size of the image stabilization apparatus in the radial direction can be suppressed even if a space is formed between the movable lens barrel for the magnetic shield and the coils as described above.

More desirably, the numerical ranges in Conditional Expressions (1) to (5) may be set as follows.

$1.3 \leq |fis/fp| \leq 4.0$ (1a)

$1.0 \leq |fw/skw| \leq 3.5$ (2a)

$2.5 \leq |f1/fw| \leq 7.5$ (3a)

$0.05 \leq |Dis/DL| \leq 0.15$ (4a)

$1.3 \leq |fis/fw| \leq 2.5$ (5a)

More desirably, the numerical ranges in Conditional Expressions (1) to (5) may be set as follows.

$1.3 \leq |fis/fp| \leq 2.5$ (1b)

$1.2 \leq |fw/skw| \leq 3.3$ (2b)

$2.7 \leq |f1/fw| \leq 7.4$ (3b)

$0.06 \leq |Dis/DL| \leq 0.14$ (4b)

$1.3 \leq |fis/fw| \leq 2.3$ (5b)

Description of Numerical Embodiments

Next, the meaning of each piece of numerical data described in the first to third numerical examples will be described. In each numerical embodiment, an optical system having a high image forming performance is obtained by appropriately setting the configuration of each lens unit, selecting an appropriate material, and appropriately performing refractive power arrangement.

In each numerical embodiment, i represents an order counted from the object side, ri represents a curvature radius of an i-th optical surface (i-th surface), and di represents an interval on the axis between the i-th surface and an (i+1)th surface. ndi and vdi respectively represent the refractive index and the Abbe number of the material of the i-th optical member on the d-line. An X-axis is set in the optical-axis direction, an H-axis is set in the direction vertical to the optical axis, the light travelling direction is set as a positive direction, R represents a paraxial curvature radius, K represents a conic constant, and A4, A6, A8, A10, and A12 represent aspherical surface coefficients, the aspherical surface shape is represented by the following expression:

$$X = \frac{H^2/R}{1 + \sqrt{1 - (1+K)(H/R)^2}} + A4H^4 + A6H^6 + A8H^8 + A10H^{10} + A12H^{12}$$ (6)

where * indicates a surface having an aspherical surface shape, "e-x" indicates $10^{-x}$, and BF indicates the back-focus of air conversion. The total optical length is a value obtained by adding the value of the back-focus BF to the distance from the first lens surface to the last lens surface. Table 1 illustrates the relationship between the conditional expressions described above and each piece of numerical data. Specific numerical values in each numerical embodiment are described below.

First Numerical Embodiment

| | Unit: mm | | | |
|---|---|---|---|---|
| | Surface data | | | |
| Surface Number | r | d | nd | vd |
| 1 | 223.288 | 1.70 | 1.80809 | 22.8 |
| 2 | 84.370 | 7.08 | 1.72916 | 54.7 |
| 3 | ∞ | 0.15 | | |
| 4 | 54.570 | 6.51 | 1.72916 | 54.7 |
| 5 | 152.061 | (variable) | | |
| 6 | 64.568 | 1.00 | 1.90043 | 37.4 |
| 7 | 15.230 | 8.62 | | |
| 8* | −27.870 | 1.10 | 1.58313 | 59.4 |
| 9* | 74.515 | 0.15 | | |
| 10 | 51.235 | 4.00 | 1.80809 | 22.8 |
| 11 | −43.337 | 1.40 | | |
| 12 | −22.960 | 0.90 | 1.80400 | 46.6 |
| 13 | −35.332 | (variable) | | |
| 14 (aperture) | ∞ | 0.30 | | |
| 15 | 31.391 | 2.98 | 1.75500 | 52.3 |
| 16 | ∞ | 0.15 | | |
| 17 | 23.275 | 1.00 | 1.81600 | 46.6 |
| 18 | 12.122 | 6.70 | 1.59282 | 68.6 |
| 19 | 1440.267 | 1.37 | | |
| 20 | −77.712 | 0.70 | 1.74951 | 35.3 |
| 21 | 19.761 | 2.40 | 2.00069 | 25.5 |
| 22 | 31.339 | 4.02 | | |
| 23 | 320.961 | 0.75 | 1.62004 | 36.3 |
| 24 | 14.230 | 3.65 | 1.49710 | 81.6 |

-continued

| Unit: mm | | | | |
|---|---|---|---|---|
| 25 | ∞ | 0.15 | | |
| 26* | 20.837 | 6.90 | 1.58313 | 59.4 |
| 27* | −23.460 | (variable) | | |
| 28 | 43.108 | 0.75 | 1.75500 | 52.3 |
| 29 | 17.710 | (variable) | | |
| 30* | −43.070 | 1.50 | 1.77250 | 49.5 |
| 31* | −257.640 | (variable) | | |
| 32 | −196.271 | 4.55 | 1.80400 | 46.6 |
| 33 | −45.164 | (variable) | | |
| Image plane | ∞ | | | |

Aspherical surface data

Eighth surface

K = 0.00000e+000  A4 = 1.34486e−006  A6 = −1.63635e−008  A8 = 4.10620e−010
A10 = −4.49790e−012  A12 = 1.71846e−014

Ninth surface

K = 0.00000e+000  A4 = −1.37150e−005  A6 = −3.01754e−010  A8 = 8.08750e−011
A10 = −2.08127e−012  A12 = 8.39909e−015

26th surface

K = 0.00000e+000  A4 = −3.44285e−005  A6 = 5.85449e−009  A8 = −3.26266e−010
A10 = 2.57133e−013  A12 = 4.93513e−015

27th surface

K = 0.00000e+000  A4 = 2.22458e−005  A6 = −9.22596e−008  A8 = 3.36111e−011
A10 = −1.63424e−012  A12 = 7.15841e−015

30th surface

K = 0.00000e+000  A4 = −5.53472e−005  A6 = 3.93232e−008  A8 = −5.91775e−010
A10 = 2.88021e−012  A12 = −2.11088e−014

31st surface

K = 0.00000e+000  A4 = −5.74057e−005  A6 = 8.88420e−008  A8 = −3.57489e−010
A10 = 6.40229e−013  A12 = −4.53796e−015

Various data
Zoom ratio 4.12

| | Wide Angle | Intermediate | Telephoto |
|---|---|---|---|
| Focal Length | 24.73 | 49.91 | 101.84 |
| F-number | 4.12 | 4.12 | 4.12 |
| Field Angle | 41.19 | 23.44 | 11.99 |
| Image Height | 21.64 | 21.64 | 21.64 |
| Total Optical Length | 124.44 | 141.43 | 168.94 |
| BF | 17.76 | 17.14 | 24.67 |
| d5 | 0.75 | 15.39 | 34.10 |
| d13 | 21.36 | 9.45 | 2.72 |
| d27 | 1.79 | 2.83 | 0.77 |
| d29 | 11.48 | 10.40 | 12.40 |
| d31 | 0.80 | 15.72 | 23.79 |
| d33 | 17.76 | 17.14 | 24.67 |

Zoom lens group data

| Group | Start Surface | Focal Length |
|---|---|---|
| 1 | 1 | 87.62 |
| 2 | 6 | −19.42 |
| 3 | 14 | 24.59 |
| 4 | 28 | −40.33 |
| 5 | 30 | −67.15 |
| 6 | 32 | 72.00 |

Second Numerical Embodiment

| | | Unit: mm | | |
|---|---|---|---|---|
| | | Surface data | | |
| Surface Number | r | d | nd | νd |
| 1 | 266.275 | 1.80 | 1.80810 | 22.8 |
| 2 | 93.368 | 6.52 | 1.72916 | 54.7 |
| 3 | ∞ | 0.15 | | |
| 4 | 49.826 | 6.97 | 1.72916 | 54.7 |
| 5 | 126.155 | (variable) | | |
| 6 | 65.832 | 1.25 | 1.95375 | 32.3 |
| 7 | 15.019 | 8.19 | | |
| 8* | −33.476 | 1.10 | 1.58313 | 59.4 |
| 9* | 65.137 | 0.15 | | |
| 10 | 40.325 | 5.03 | 1.80810 | 22.8 |
| 11 | −40.325 | 0.97 | | |
| 12 | −25.491 | 1.00 | 1.80400 | 46.6 |
| 13 | −63.435 | (variable) | | |
| 14 (aperture) | ∞ | 0.30 | | |
| 15 | 44.965 | 2.30 | 1.91082 | 35.3 |
| 16 | ∞ | 0.15 | | |
| 17 | 21.533 | 1.00 | 1.95375 | 32.3 |
| 18 | 13.108 | 6.76 | 1.59522 | 67.7 |
| 19 | −795.231 | 1.37 | | |
| 20 | −152.936 | 0.80 | 1.74951 | 35.3 |
| 21 | 16.038 | 2.88 | 2.00069 | 25.5 |
| 22 | 30.717 | 3.81 | | |
| 23 | 76.401 | 0.75 | 1.78472 | 25.7 |
| 24 | 19.110 | 3.57 | 1.49700 | 81.5 |
| 25 | ∞ | 0.15 | | |
| 26* | 24.461 | 7.26 | 1.58313 | 59.4 |
| 27* | −25.212 | (variable) | | |
| 28 | 121.315 | 0.75 | 1.72916 | 54.7 |
| 29 | 23.846 | (variable) | | |
| 30* | −43.071 | 1.50 | 1.76450 | 49.1 |
| 31* | −248.821 | (variable) | | |
| 32 | −68.116 | 4.50 | 1.80400 | 46.6 |
| 33 | −32.318 | (variable) | | |
| Image plane | ∞ | | | |

Spherical surface data

Eighth surface

K = 0.00000e+000   A4 = 5.17863e−006   A6 = −6.74704e−008   A8 = 5.22888e−010
A10 = −4.25942e−012   A12 = 1.45835e−014

Ninth surface

K = 0.00000e+000   A4 = −7.77410e−006   A6 = −4.92259e−008

26th surface

K = 0.00000e+000   A4 = −2.73692e−005   A6 = 5.32572e−008   A8 = −8.44820e−010
A10 = 5.56287e−012

27th surface

K = 0.00000e+000   A4 = 1.47893e−005   A6 = 2.32565e−009   A8 = −6.75778e−010
A10 = 4.79574e−012

30th surface

K = 0.00000e+000   A4 = −8.05959e−005   A6 = 1.99191e−007   A8 = −1.06561e−009
A10 = −7.47195e−013   A12 = 8.67762e−015

31st surface

K = 0.00000e+000   A4 = −7.18829e−005   A6 = 2.81391e−007   A8 = −1.44320e−009
A10 = 4.20650e−012   A12 = −5.37088e−015

Various data
Zoom ratio 4.12

| | Wide Angle | Intermediate | Telephoto |
|---|---|---|---|
| Focal Length | 24.72 | 50.92 | 101.84 |
| F-number | 4.12 | 4.12 | 4.12 |
| Field Angle | 41.19 | 23.02 | 11.99 |
| Image Height | 21.64 | 21.64 | 21.64 |

| Unit: mm | | | |
|---|---|---|---|
| Total Optical Length | 125.34 | 142.50 | 169.34 |
| BF | 17.88 | 19.75 | 30.96 |
| d5 | 0.75 | 15.82 | 34.38 |
| d13 | 21.53 | 9.07 | 2.38 |
| d27 | 1.80 | 3.37 | 1.40 |
| d29 | 11.59 | 10.02 | 11.99 |
| d31 | 0.80 | 13.48 | 17.24 |
| d33 | 17.88 | 19.75 | 30.96 |

| Zoom lens group data | | |
|---|---|---|
| Group | Start Surface | Focal Length |
| 1 | 1 | 88.25 |
| 2 | 6 | −18.38 |
| 3 | 14 | 24.16 |
| 4 | 28 | −40.84 |
| 5 | 30 | −68.35 |
| 6 | 32 | 72.42 |

Third Numerical Embodiment

| Unit: mm | | | |
|---|---|---|---|
| Surface data | | | |
| Surface Number | r | d | nd | vd |
|---|---|---|---|---|
| 1 | 392.310 | 2.10 | 1.80810 | 22.8 |
| 2 | 127.503 | 4.67 | 1.72916 | 54.7 |
| 3 | 667.842 | 0.15 | | |
| 4 | 54.884 | 7.42 | 1.72916 | 54.7 |
| 5 | 153.255 | (variable) | | |
| 6 | 64.348 | 1.40 | 1.83481 | 42.7 |
| 7 | 17.048 | 7.44 | | |
| 8 | 27996.689 | 1.20 | 1.59522 | 67.7 |
| 9 | 18.868 | 3.95 | 1.85478 | 24.8 |
| 10 | 39.686 | 3.55 | | |
| 11 | −43.850 | 1.20 | 1.58313 | 59.4 |
| 12* | −173.426 | 0.15 | | |
| 13 | 355.894 | 5.77 | 1.59270 | 35.3 |
| 14 | −18.473 | 1.10 | 1.88300 | 40.8 |
| 15 | −58.258 | (variable) | | |
| 16 (aperture) | ∞ | 0.40 | | |
| 17 | 87.834 | 3.83 | 1.76385 | 48.5 |
| 18 | −65.580 | 0.15 | | |
| 19 | 40.015 | 7.30 | 1.59522 | 67.7 |
| 20 | −36.554 | 1.10 | 2.00069 | 25.5 |
| 21 | −129.446 | 2.47 | | |
| 22* | −51.044 | 1.50 | 1.58313 | 59.4 |
| 23 | 43.427 | 0.00 | | |
| 24 | 43.427 | 1.99 | 1.72825 | 28.5 |
| 25 | 76.138 | (variable) | | |
| 26 | 27.612 | 6.78 | 1.49700 | 81.5 |
| 27 | −136.151 | 0.15 | | |
| 28 | 41.980 | 4.39 | 1.49700 | 81.5 |
| 29 | −214.494 | 0.15 | | |
| 30 | 44.999 | 6.97 | 1.49700 | 81.5 |
| 31 | −32.436 | 1.50 | 1.85400 | 40.4 |
| 32* | 3044.402 | (variable) | | |
| 33 | 237.728 | 0.90 | 1.95375 | 32.3 |
| 34 | 31.850 | (variable) | | |
| 35* | −55.904 | 1.40 | 1.58313 | 59.4 |
| 36* | 68002.899 | 0.15 | | |
| 37 | 178.752 | 5.17 | 2.00069 | 25.5 |
| 38 | −55.299 | 1.40 | 1.88300 | 40.8 |
| 39 | −102.512 | (variable) | | |
| Image plane | ∞ | | | |

-continued

Unit: mm

Aspherical surface data

12th surface

K = 0.00000e+000   A4 = −7.73015e−006   A6 = −2.45711e−009   A8 = −1.36991e−010
A10 = 8.92197e−013   A12 = −3.17289e−015

22nd surface

K = 0.00000e+000   A4 = 4.13779e−006   A6 = 3.95825e−009   A8 = 1.25042e−011
A10 = −1.79610e−013   A12 = 3.88483e−016

32nd surface

K = 0.00000e+000   A4 = 2.42610e−005   A6 = 7.09586e−009   A8 = 3.65492e−011
A10 = −1.07614e−013   A12 = 9.63094e−016

35th surface

K = 0.00000e+000   A4 = −6.77153e−006   A6 = −3.91035e−008   A8 = −1.11068e−011
A10 = −1.77528e−013   A12 = −1.39223e−016

36th surface

K = 0.00000e+000   A4 = −7.20605e−006   A6 = −2.55759e−008

Various data
Zoom ratio 2.75

|  | Wide Angle | Intermediate | Telephoto |
| --- | --- | --- | --- |
| Focal Length | 24.72 | 45.33 | 67.89 |
| F-number | 2.88 | 2.88 | 2.88 |
| Field Angle | 41.19 | 25.51 | 17.68 |
| Image Height | 21.64 | 21.64 | 21.64 |
| Total Optical Length | 144.51 | 160.46 | 176.40 |
| BF | 15 | 26.31 | 35.56 |
| d5 | 0.80 | 18.69 | 29.07 |
| d15 | 15.62 | 6.31 | 2.49 |
| d25 | 13.16 | 8.12 | 6.11 |
| d32 | 1.50 | 2.09 | 1.49 |
| d34 | 10.63 | 11.14 | 13.87 |
| d39 | 15.00 | 26.31 | 35.56 |

Zoom lens group data

| Group | Start Surface | Focal Length |
| --- | --- | --- |
| 1 | 1 | 109.80 |
| 2 | 6 | −17.10 |
| 3 | 16 | 51.53 |
| 4 | 26 | 27.65 |
| 5 | 33 | −38.64 |
| 6 | 35 | 160.61 |

TABLE 1

|  | First Numerical Embodiment | Second Numerical Embodiment | Third Numerical Embodiment |
| --- | --- | --- | --- |
| fis | −34.70 | −46.84 | −56.17 |
| fp | 22.39 | 24.65 | 27.65 |
| fw | 24.73 | 24.72 | 24.72 |
| skw | 17.76 | 17.88 | 15.00 |
| fl | 87.62 | 88.25 | 109.80 |
| Dis | 15.61 | 15.56 | 18.74 |
| DL | 124.44 | 125.34 | 144.51 |
| Conditional Expression (1) | 1.55 | 1.90 | 2.03 |
| Conditional Expression (2) | 1.39 | 1.38 | 1.65 |
| Conditional Expression (3) | 4.93 | 4.93 | 7.32 |
| Conditional Expression (4) | 0.13 | 0.12 | 0.13 |
| Conditional Expression (5) | 1.40 | 1.89 | 2.27 |

Modified Examples

Exemplary embodiments of the present disclosure have been described above. However, the present disclosure is not limited to the exemplary embodiments and can be changed or modified in various manners within the scope of the present disclosure.

For example, the interchangeable lenses according to the first to third exemplary embodiments described above include a coil and a magnet for driving in the yaw direction and a coil and a magnet for driving in the pitch direction. Further, at least a part of the coil for driving in the yaw direction and at least a part of the coil for driving in the pitch direction are covered by a magnetic shield as viewed in the optical-axis direction and as viewed in the direction crossing the optical axis. However, for example, at least a part of the coil may be covered by the magnetic shield as viewed in the optical-axis direction and as viewed in the direction crossing the optical axis only for one of the coil for driving in the yaw direction and the coil for driving in the pitch direction, by giving the highest priority to a reduction in the weight of the interchangeable lens.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-165390, filed Sep. 4, 2018, which is hereby incorporated by reference herein in its entirety.

What is claimed is:

1. A lens apparatus comprising:
an imaging optical system including a plurality of lenses;
a movable member holding at least one lens among the plurality of lenses and configured to move in a direction including a component perpendicular to an optical axis of the imaging optical system;
a fixed member whose movement in the direction is restricted;
a coil provided at one of the movable member or the fixed member and configured to move the movable member in the direction;
a magnet provided at the other of the movable member or the fixed member and configured to move the movable member in the direction; and
a first shield member configured to cover at least a part of the coil as viewed in a direction parallel to the optical axis and as viewed in the direction perpendicular to the optical axis, at least a part of the first shield member being arranged closer to an image plane than the coil,
wherein the imaging optical system includes a lens unit having a positive refractive power and arranged closer to the image plane than the at least one lens, the lens unit being fixed while the movable member moves in the direction, and
wherein the lens apparatus satisfies the following expression:

$$0.8 \le |\mathit{fis}/\mathit{fp}| \le 8.0$$

where a focal length of the at least one lens is represented by fis, and a focal length of the lens unit is represented by fp.

2. The lens apparatus according to claim 1, wherein the first shield member is configured to cover the entire coil as viewed in the direction parallel to the optical axis.

3. The lens apparatus according to claim 1,
wherein the first shield member is provided an opening, and
wherein the fixed member has a protruding portion inserted to the opening.

4. The lens apparatus according to claim 1, wherein the first shield member is configured to cover the entire coil as viewed in the direction perpendicular to the optical axis.

5. The lens apparatus according to claim 1, wherein the first shield member covers at least a part of the magnet as viewed in the direction parallel to the optical axis and as viewed in the direction perpendicular to the optical axis.

6. The lens apparatus according to claim 1, further comprising:
a yoke configured to magnetically attract the magnet,
wherein the first shield member covers at least a part of the yoke as viewed in the direction parallel to the optical axis and as viewed in the direction perpendicular to the optical axis.

7. The lens apparatus according to claim 1, further comprising a second shield member configured to cover at least a part of the coil as viewed in the direction parallel to the optical axis, at least a part of the second shield member being arranged closer to an object than the coil in the imaging optical system.

8. The lens apparatus according to claim 7, wherein the second shield member does not cover at least a part of the coil as viewed in the direction perpendicular to the optical axis.

9. The lens apparatus according to claim 7, wherein the second shield member covers at least a part of the magnet as viewed in the direction parallel to the optical axis and as viewed in the direction perpendicular to the optical axis.

10. The lens apparatus according to claim 7, further comprising:
a yoke configured to magnetically attract the magnet,
wherein the second shield member covers at least a part of the yoke as viewed in the direction parallel to the optical axis and as viewed in the direction perpendicular to the optical axis.

11. The lens apparatus according to claim 1,
wherein the imaging optical system serves as a zoom lens, and
wherein the lens apparatus satisfies the following expression:

$$0.5 \le |\mathit{fw}/\mathit{skw}| \le 5.0$$

where a focal length of the imaging optical system during focusing at infinity at a wide-angle end is represented by fw, and a back-focus of the imaging optical system at the wide-angle end is represented by skw.

12. The lens apparatus according to claim 1,
wherein the imaging optical system comprises a plurality of lens units including a first lens unit arranged closest to the image plane,
wherein an interval between adjacent lens units varies during zooming, and
wherein the lens apparatus satisfies the following expression:

$$1.0 \le |\mathit{f1}/\mathit{fw}| \le 9.0$$

where a focal length of the imaging optical system during focusing on at infinity at a wide-angle end is represented by fw, and a focal length of the first lens unit is represented by f1.

13. The lens apparatus according to claim 1,
wherein the imaging optical system includes an aperture diaphragm, and
wherein the lens apparatus satisfies the following expression:

$$0.01 \le |\mathit{Dis}/\mathit{DL}| \le 0.30$$

where a total optical length of the imaging optical system during focusing at infinity at a wide-angle end is represented by DL, and a distance on the optical axis from the aperture diaphragm to a lens surface farthest from the aperture diaphragm among surfaces of the at least one lens is represented by Dis.

14. The lens apparatus according to claim 1, wherein the lens apparatus satisfies the following expression:

$$0.5 \le |\mathit{fis}/\mathit{fw}| \le 5.0$$

where a focal length of the imaging optical system during focusing at infinity at a wide-angle end is represented by fw.

15. The lens apparatus according to claim 1, wherein the plurality of lenses includes a plurality of positive lenses arranged closer to the image plane than the at least one lens.

16. The lens apparatus according to claim 1, wherein the lens apparatus is detachably mountable to an imaging apparatus including an image sensor.

17. An imaging system comprising:
the lens apparatus according to claim 1; and
an image sensor configured to receive light from the lens apparatus.

* * * * *